US007596546B2

(12) United States Patent
Matchett et al.

(10) Patent No.: US 7,596,546 B2
(45) Date of Patent: Sep. 29, 2009

(54) METHOD AND APPARATUS FOR ORGANIZING, VISUALIZING AND USING MEASURED OR MODELED SYSTEM STATISTICS

(76) Inventors: Douglas K. Matchett, 10601 Double Tree Cv, Austin, TX (US) 78750; Annette S. Palmer, 10601 Oak View Dr., Austin, TX (US) 78759; Timothy E. Wise, 5107 Turnabout La., Austin, TX (US) 78731; Ted Lehr, 13240 Fieldstone Loop, Austin, TX (US) 78737

( * ) Notice: Subject to any disclaimer, the term of this patent is extended or adjusted under 35 U.S.C. 154(b) by 371 days.

(21) Appl. No.: 11/153,034

(22) Filed: Jun. 14, 2005

(65) Prior Publication Data

US 2006/0041539 A1    Feb. 23, 2006

Related U.S. Application Data

(60) Provisional application No. 60/579,456, filed on Jun. 14, 2004, provisional application No. 60/579,306, filed on Jun. 14, 2004, provisional application No. 60/579,305, filed on Jun. 14, 2004, provisional application No. 60/579,329, filed on Jun. 14, 2004.

(51) Int. Cl.
    *G06F 7/00* (2006.01)
(52) U.S. Cl. .............................. 707/3; 707/100; 705/7
(58) Field of Classification Search .................. 707/1, 707/100
    See application file for complete search history.

(56) References Cited

U.S. PATENT DOCUMENTS

| | | | |
|---|---|---|---|
| 5,446,885 A | 8/1995 | Moore et al. | |
| 5,560,014 A | 9/1996 | Imamura | |
| 5,581,760 A | 12/1996 | Atkinson et al. | |
| 5,630,127 A | 5/1997 | Moore et al. | |
| 5,710,926 A | 1/1998 | Maurer | |
| 5,819,007 A | 10/1998 | Elghazzawi | |
| 5,875,285 A | 2/1999 | Chang | |
| 5,900,870 A | 5/1999 | Malone et al. | |
| 5,946,661 A | 8/1999 | Rothschild et al. | |

(Continued)

OTHER PUBLICATIONS

Prague et al., Access 97 Bible, IDB Boods Worldwide, Inc., 1997, pp. xli, 17, 18, 118, 119, 237-248, 332-340, 564, 569, and 665.*

*Primary Examiner*—Cheyne D Ly
(74) *Attorney, Agent, or Firm*—Schultz & Associates, P.C.

(57) ABSTRACT

An apparatus and methodology to acquire and organize measured or modeled statistical data into optimal reports with a performance engineering mode of use and a design mode of use. In a performance engineering mode of use, the engineer may select from a set of performance questions, and guided by the apparatus and largely automated, create well-defined answers to the performance questions of interest. A series of template manipulations whereby report objects that are embedded within templates may be defined, reused, modified and improved upon to optimize reports and to aid in a report building process in a design mode of use. Methods are taught for the automatic selection and population of data tables. Column selection and column header information is optimized for relevance to the report design or system question at hand. The automatic joining of data from a variety of data sources is taught that allows for the rapid construction of specific reports from within multiple data tables of different types, structures and formats.

4 Claims, 33 Drawing Sheets

U.S. PATENT DOCUMENTS

| | | |
|---|---|---|
| 5,987,453 A | 11/1999 | Krishna et al. |
| 6,061,675 A | 5/2000 | Wical |
| 6,144,893 A | 11/2000 | Van Der Vegt et al. |
| 6,167,405 A | 12/2000 | Rosensteel, Jr. et al. |
| 6,182,279 B1 | 1/2001 | Buxton |
| 6,195,665 B1 | 2/2001 | Jarett |
| 6,195,794 B1 | 2/2001 | Buxton |
| 6,446,063 B1 | 9/2002 | Chen et al. |
| 6,507,835 B1 | 1/2003 | Amundsen et al. |
| 6,529,901 B1 | 3/2003 | Chaudhuri et al. |
| 6,546,394 B1 | 4/2003 | Chong et al. |
| 6,553,371 B2 | 4/2003 | Gutierrez-Rivas |
| 6,564,113 B1 | 5/2003 | Barto et al. |
| 6,564,204 B1 | 5/2003 | Amundsen et al. |
| 6,604,084 B1 | 8/2003 | Powers et al. |
| 6,615,182 B1 | 9/2003 | Powers et al. |
| 6,615,206 B1 | 9/2003 | Jakobsson et al. |
| 6,618,852 B1 | 9/2003 | van Eikeren et al. |
| 6,643,660 B1 | 11/2003 | Miller et al. |
| 6,694,507 B2 | 2/2004 | Arnold et al. |
| 6,697,799 B1 | 2/2004 | Neal et al. |
| 6,721,754 B1 | 4/2004 | Hurst et al. |
| 6,757,579 B1 | 6/2004 | Pasadyn |
| 2001/0044759 A1 | 11/2001 | Kutsumi et al. |
| 2002/0103777 A1 | 8/2002 | Zhang |
| 2002/0129348 A1 | 9/2002 | Kerpan et al. |
| 2002/0169735 A1 | 11/2002 | Kil et al. |
| 2003/0018490 A1 | 1/2003 | Magers et al. |
| 2003/0105768 A1 | 6/2003 | Berkowitz et al. |
| 2003/0120372 A1 | 6/2003 | Ruth et al. |
| 2003/0172054 A1 | 9/2003 | Berkowitz et al. |
| 2003/0182307 A1 | 9/2003 | Chen et al. |
| 2003/0204348 A1 | 10/2003 | Suzuki et al. |
| 2003/0212643 A1 | 11/2003 | Steele et al. |
| 2003/0212701 A1 | 11/2003 | Beavin et al. |
| 2003/0229641 A1 | 12/2003 | Kamath et al. |
| 2003/0236585 A1 | 12/2003 | Kao et al. |
| 2004/0044985 A1 | 3/2004 | Kompalli et al. |
| 2004/0059740 A1 | 3/2004 | Hanakawa et al. |
| 2004/0064552 A1* | 4/2004 | Chong et al. ................. 709/224 |
| 2004/0068340 A1 | 4/2004 | Mayberry |
| 2004/0093107 A1 | 5/2004 | Good et al. |
| 2004/0098706 A1 | 5/2004 | Khan et al. |
| 2004/0103108 A1 | 5/2004 | Andreev et al. |
| 2004/0117050 A1 | 6/2004 | Oskin et al. |
| 2004/0133595 A1 | 7/2004 | Black |
| 2004/0148587 A1 | 7/2004 | Conrad et al. |
| 2004/0148589 A1 | 7/2004 | Conrad et al. |
| 2004/0153187 A1 | 8/2004 | Knight et al. |
| 2004/0153189 A1 | 8/2004 | Emerson et al. |

* cited by examiner

Function of Visualizer

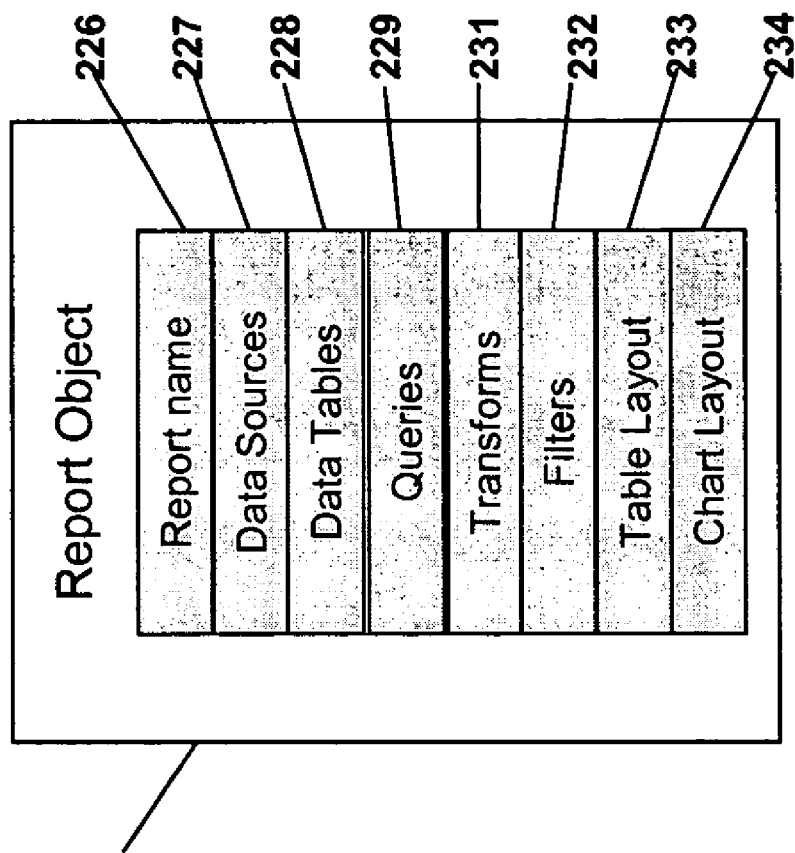
FIG. 2B Report Object

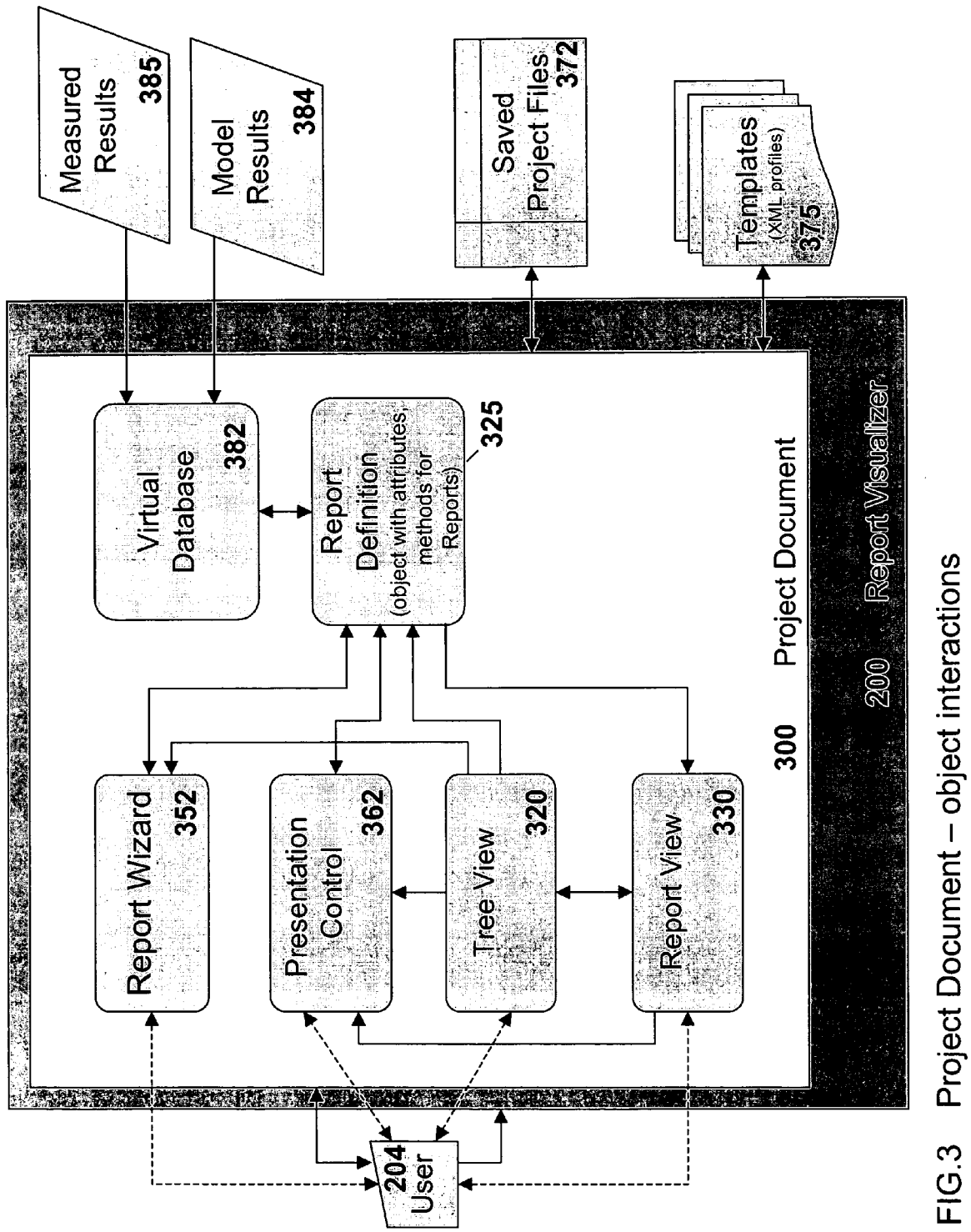
FIG.3  Project Document – object interactions

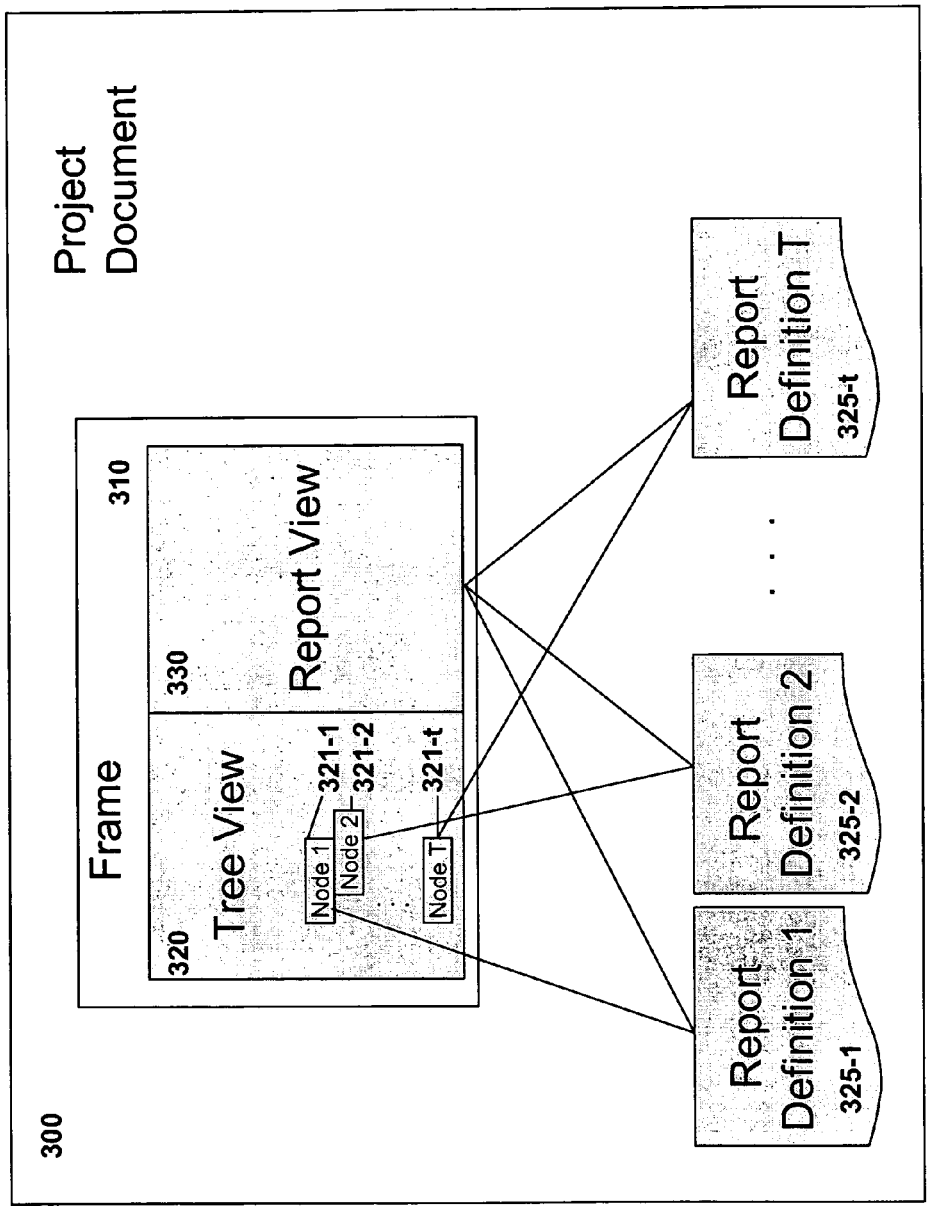
FIG. 4 Project Document – Frame and Report Structures

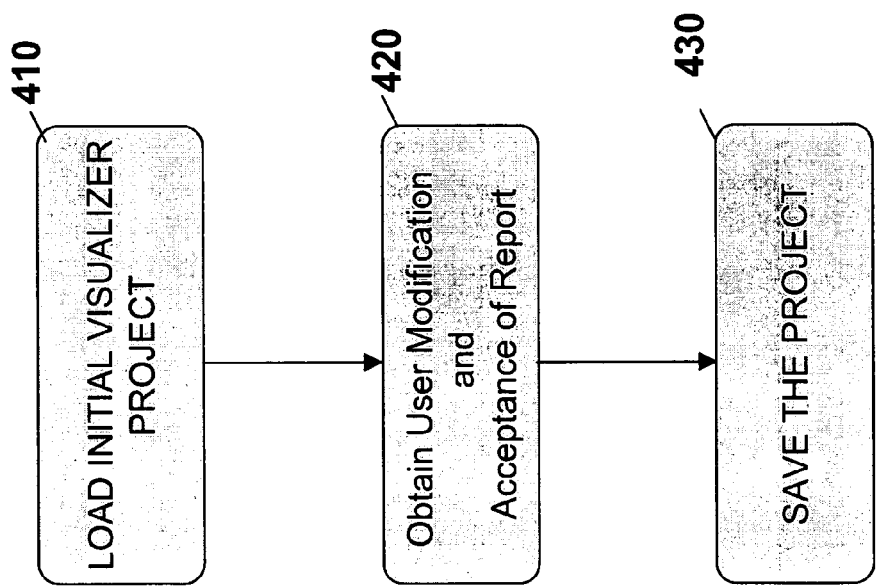
FIG. 5   Template Mode of Use

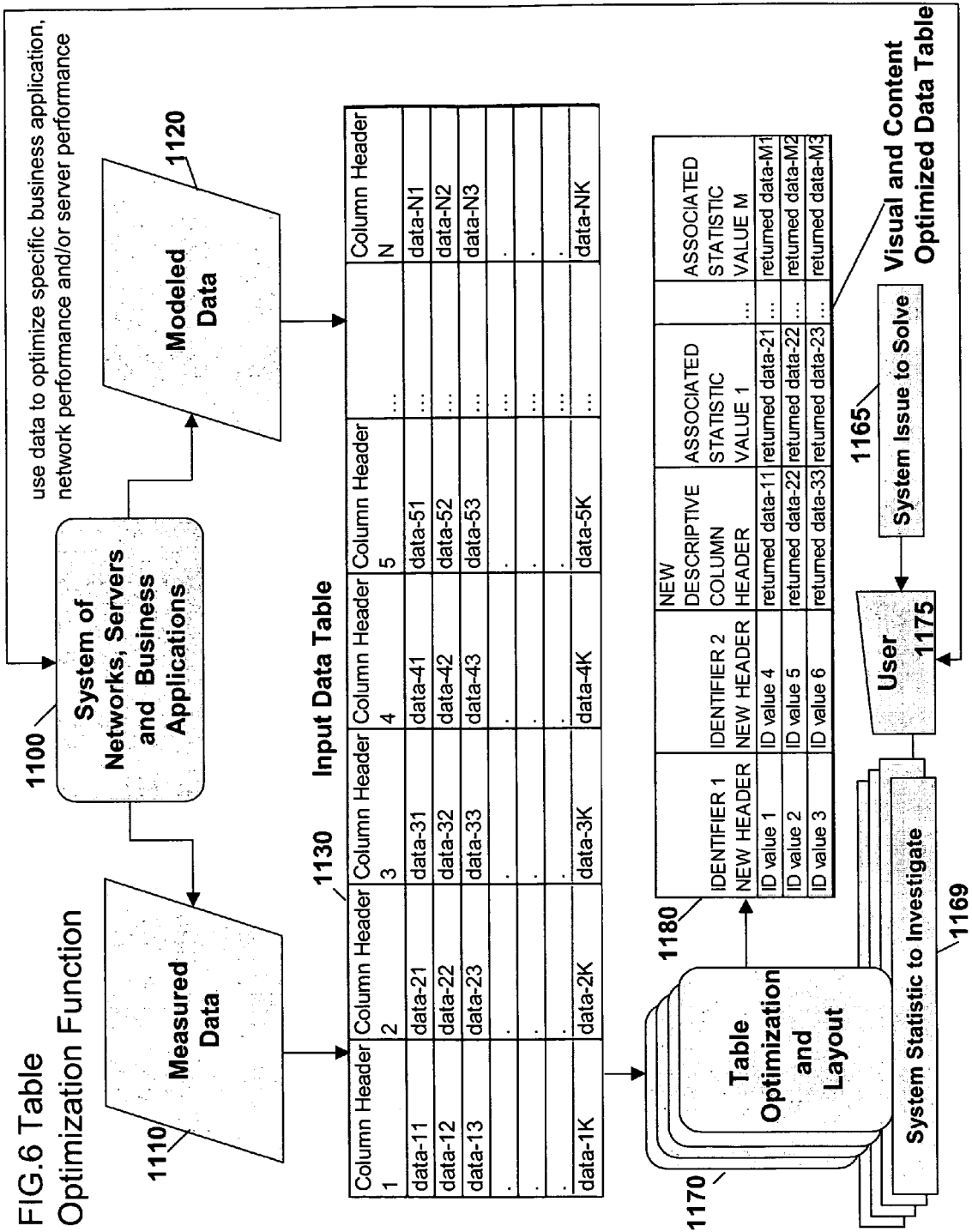

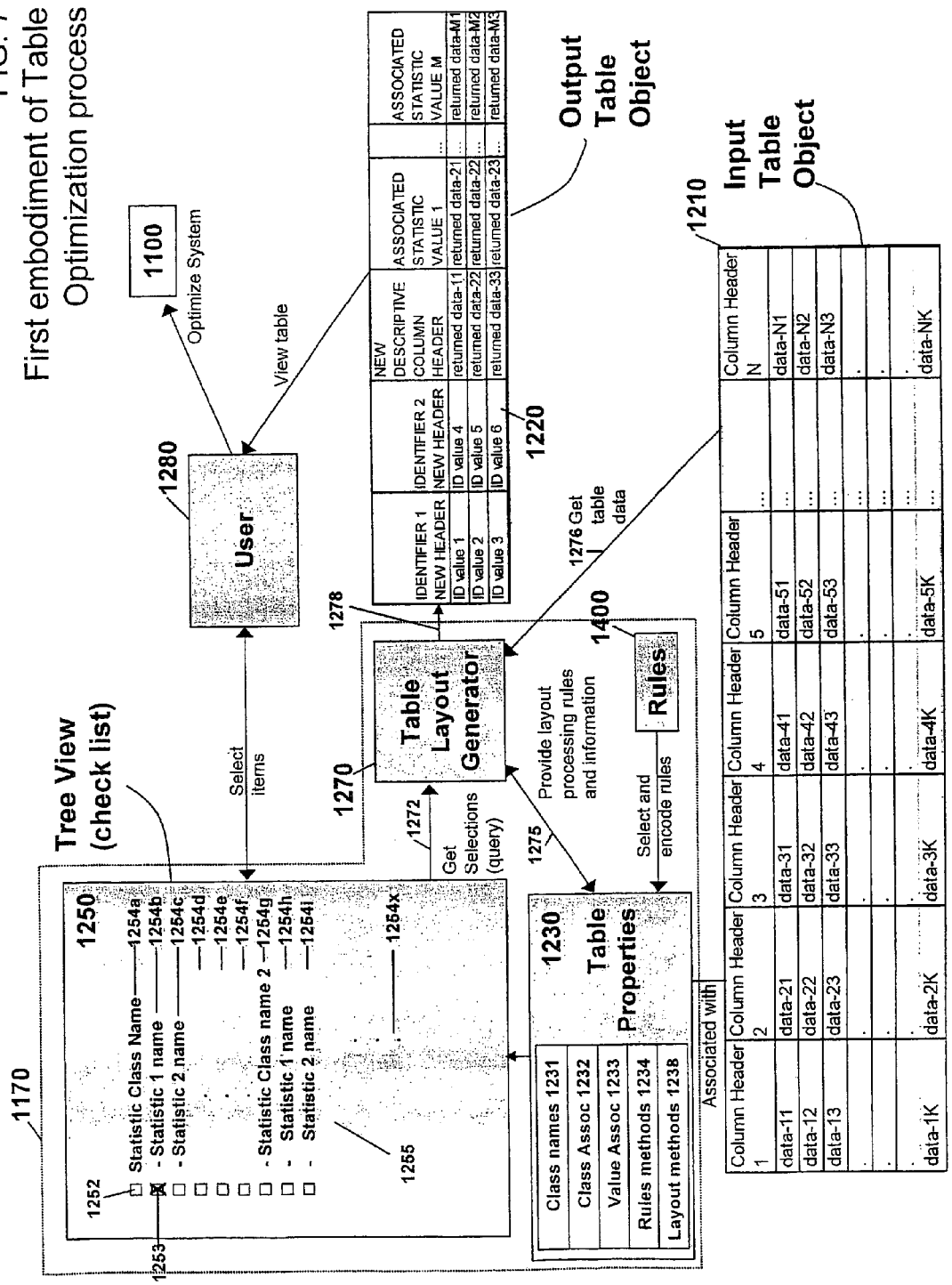
FIG. 7 First embodiment of Table Optimization process

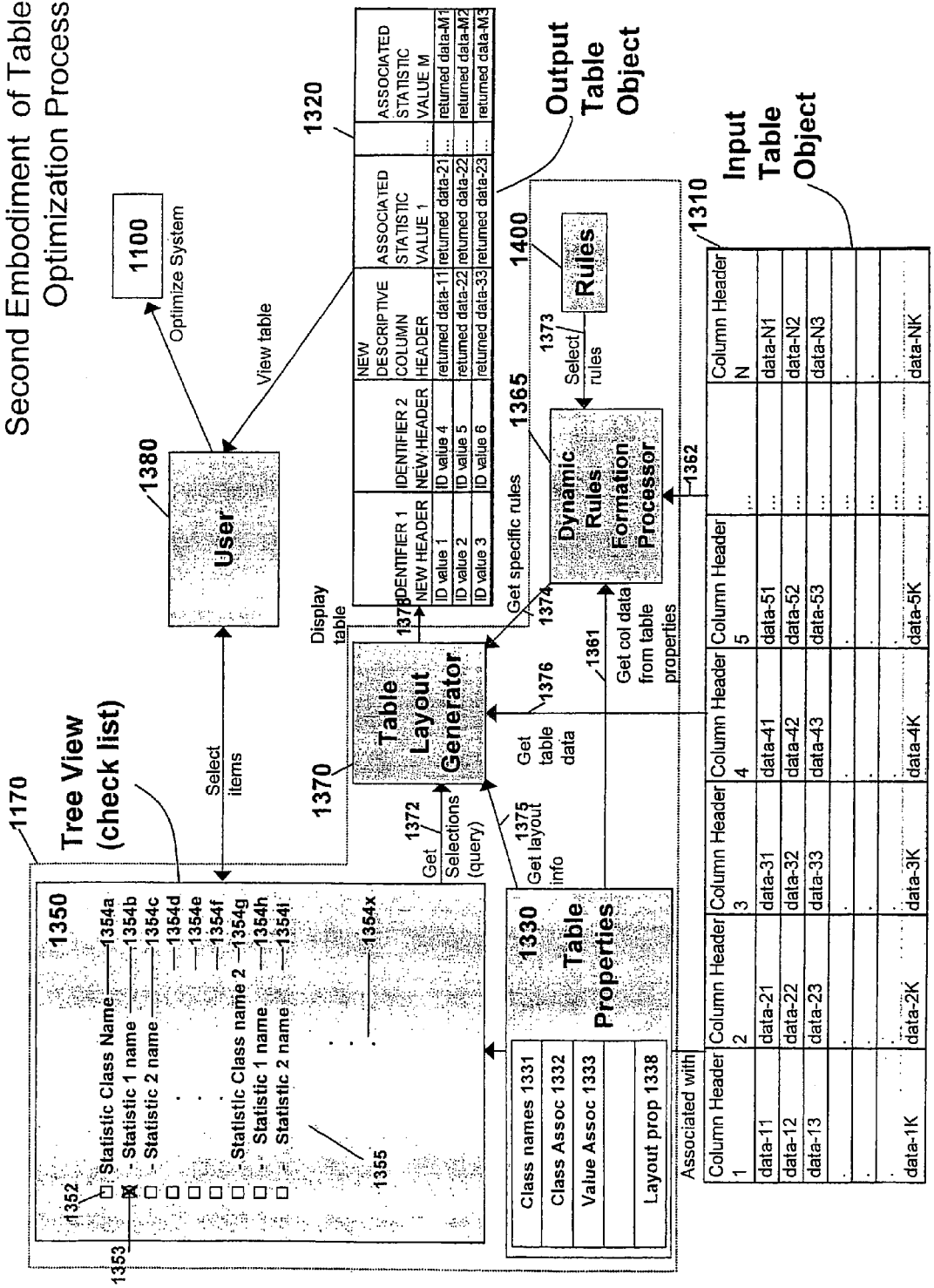
FIG. 8 Second Embodiment of Table Optimization Process

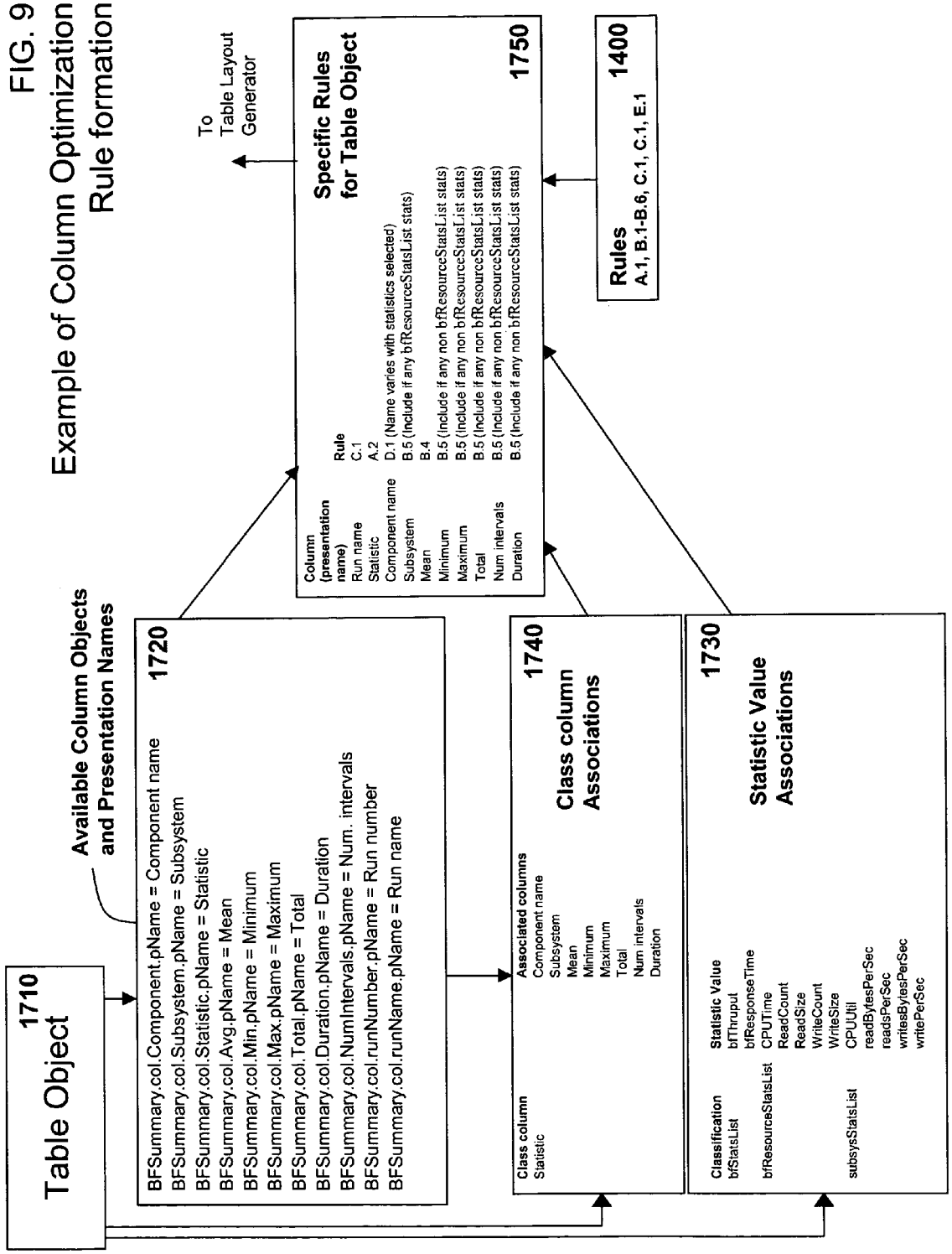

FIG. 10  Instance of Column Rule Execution

Example of an automatically generated table where only the bfResponseTime statistic is selected.

New Table (5) — 800

| Business function | Mean business function response time | Minimum | Maximum | Total | Duration | Num. intervals |
|---|---|---|---|---|---|---|
| Action_Transaction | 0.0422 | 0.031 | 0.0636 | 1182 | 299 | 299 |
| BF_Login | 0.0305 | 0.0224 | 0.0533 | 855 | 299 | 299 |
| BF_Logout | 0.0115 | 0.00853 | 0.0241 | 323 | 299 | 299 |

810. Rules applied to get this table:

810.C.1 -- Run column dropped.

810.D.1 -- Component name column renamed to the component type value per statistics selection classification (Business Function).

810.B.5 -- Subcomponent name column dropped based on statistics selected.

810.A.2 -- Statistic column dropped because value queried was unique.

810.B.4 -- Mean column renamed

810.B.5 -- Maximum, Total, Duration and Num Intervals columns included.

Example of an normally generated table if Table Optimizer is not used — 820

| Component | Subsystem | Statistic | Avg | Min | Max | Total | Duration | NumIntervals | runNumber | runName |
|---|---|---|---|---|---|---|---|---|---|---|
| Action Transaction | | bfResponseTime | 0.042 | 0.031 | 0.0636 | 1182 | 299 | 299 | 1 | BFResourceSummary1.csv |
| BF_Login | | bfResponseTime | 0.031 | 0.0224 | 0.0533 | 855 | 299 | 299 | 1 | BFResourceSummary1.csv |
| BF_Logout | | bfResponseTime | 0.012 | 0.00853 | 0.0241 | 323 | 299 | 299 | 1 | BFResourceSummary1.csv |

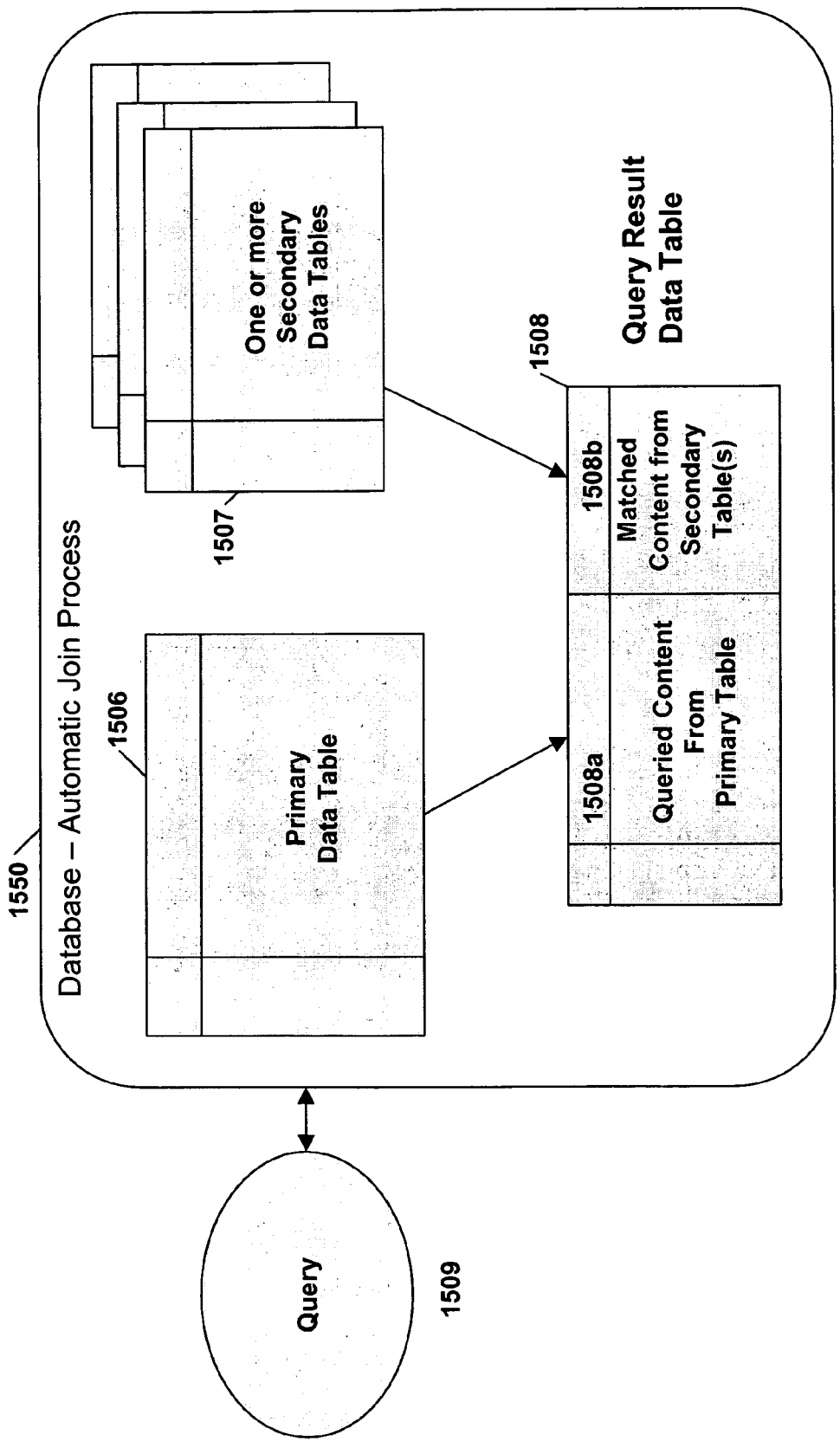
FIG. 11 Automatic Joining of multiple tables – block diagram

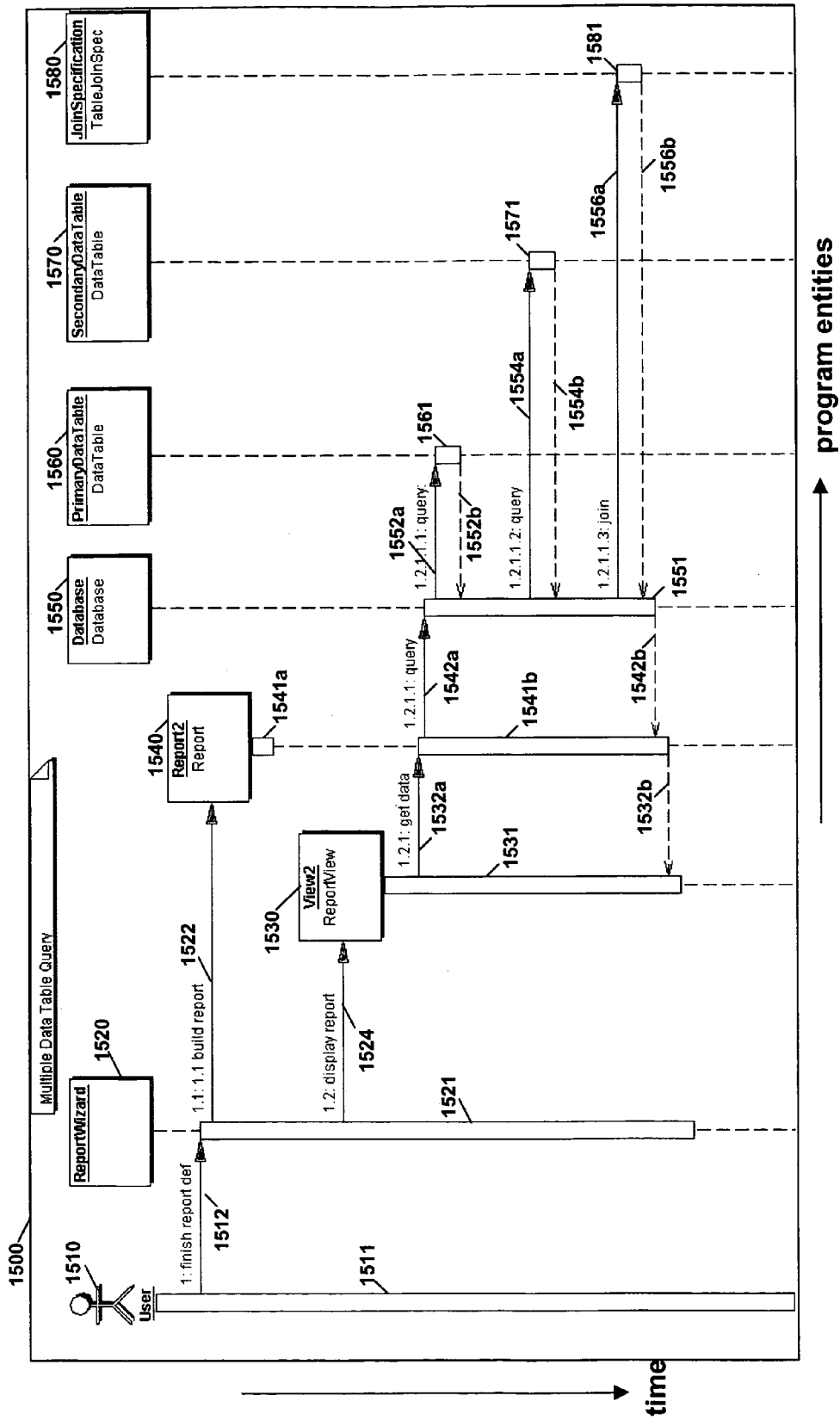
FIG. 12 Automatic joining of multiple tables - process diagram

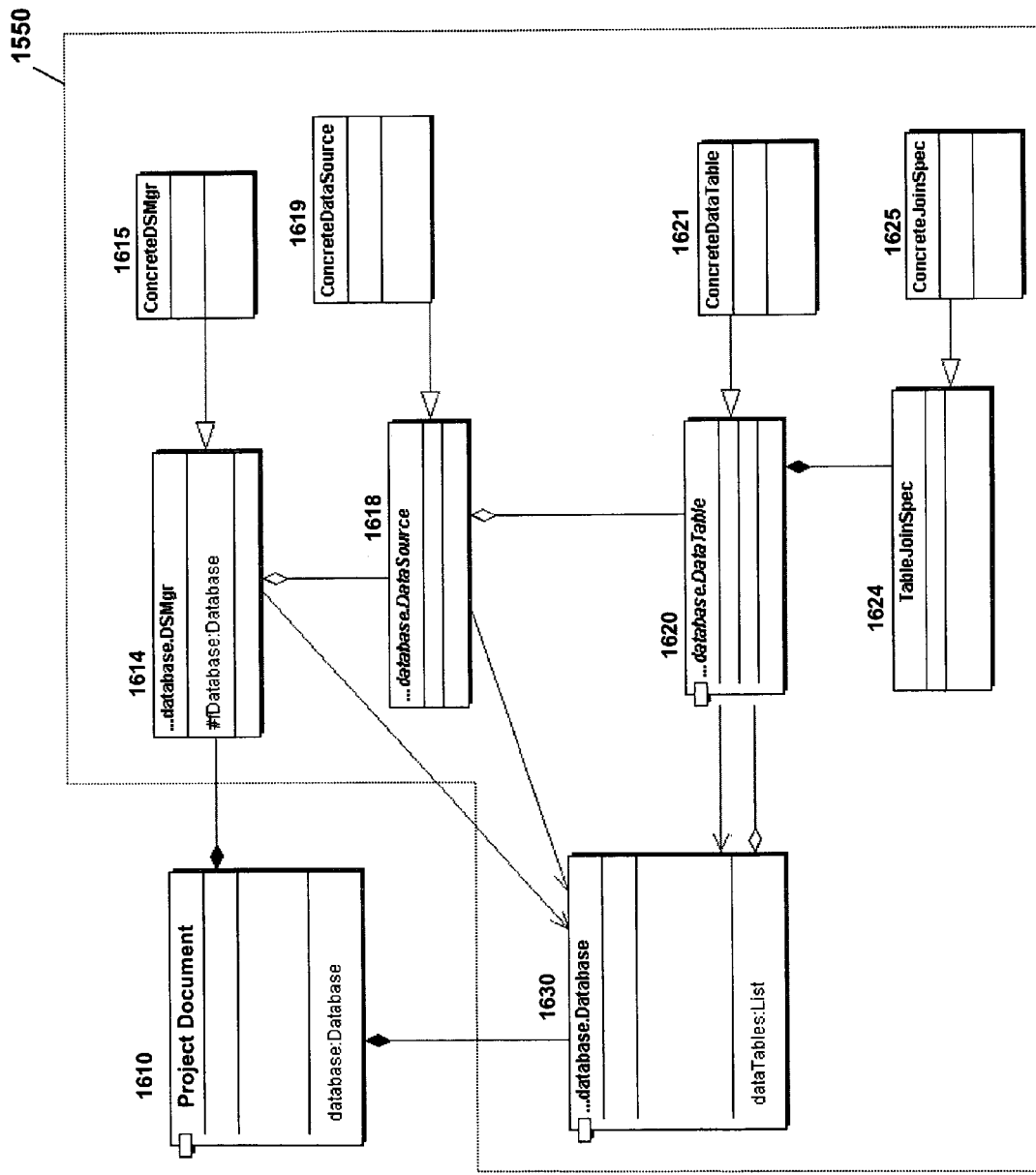
FIG. 13 Virtual Database Structure

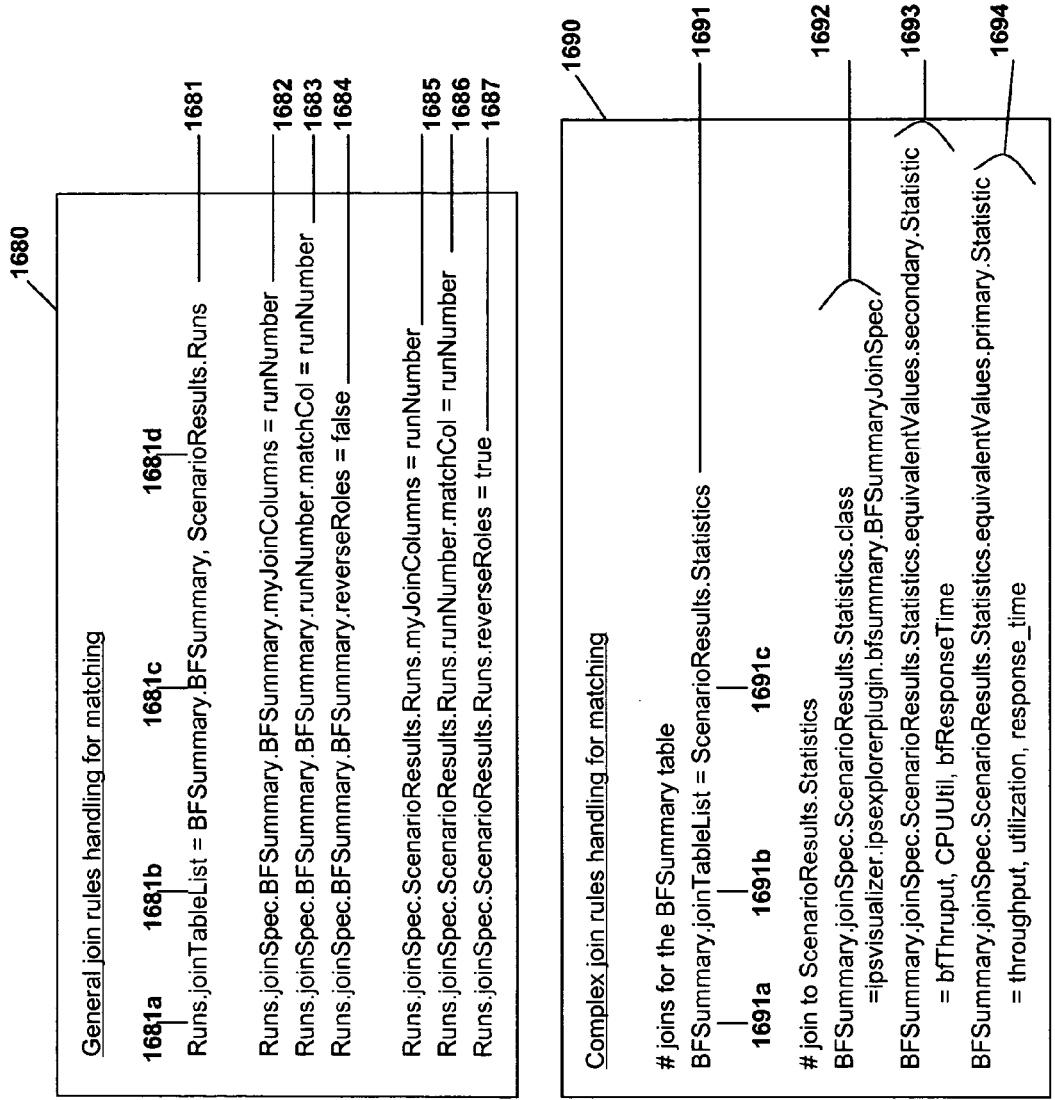
FIG. 14 Join specification match rules example

FIG. 15A

| | LIST OF REPORTS | questions or reports folders | reports | questions only |
|---|---|---|---|---|
| 15-1 | LIST OF REPORTS | | | |
| 15-2 | STANDARD REPORTS | 92 | 244 | 11 |
| 15-3 | Reports from SingleRunProject and MultirunProject templates | | | |
| 15-4 | Are the performance objectives being met? | 1 | | 1 |
| 15-5 | How does the performance compare to the objectives? | 1 | | 1 |
| 15-6 | What objectives are not satisfied? | 1 | | 1 |
| 15-7 | Key performance indicators | 1 | | |
| 15-8 | Business function 90th percentile reponse time information chart | | 1 | |
| 15-9 | Business function response time information | | 1 | |
| 15-10 | Business function throughput information chart | | 1 | |
| 15-11 | Business function throughput information | | 1 | |
| 15-12 | Nonzero CPU capacity utilization chart | | 1 | |
| 15-13 | CPU utilization information | | 1 | |
| 15-14 | Nonzero disk utilization information chart | | 1 | |
| 15-15 | Disk utilization information | | 1 | |
| 15-16 | Nonzero network utilization information chart | | 1 | |
| 15-17 | Network utilization information | | 1 | |
| 15-18 | Subsystem population information chart | | 1 | |
| 15-19 | Key performance indicators working data | 1 | | |
| 15-20 | CPU capacity utilization information | | 1 | |
| 15-21 | Where are the potential bottlenecks? | 1 | | 1 |
| 15-22 | Top 5 mean utilizations chart | | 1 | |
| 15-23 | Top 5 mean utilizations | | 1 | |
| 15-24 | Top 5 ending populations chart | | 1 | |
| 15-25 | Top 5 ending populations | | 1 | |
| 15-26 | Working tables for potential bottlenecks | 1 | | |
| 15-27 | All mean utilizations | | 1 | |
| 15-28 | Where is the response time spent? | 1 | | 1 |
| 15-29 | Where is the business function response time spent? | 1 | | 1 |
| 15-30 | Business function response time breakdown chart | | 1 | |
| 15-31 | Business function maximum response time breakdown chart | | 1 | |
| 15-32 | Where is the transaction response time spent? | 1 | | 1 |
| 15-33 | Transaction response time breakdown | | 1 | |
| 15-34 | Application performance reports | 1 | | |
| 15-35 | Behavior summary | 1 | | |
| 15-36 | Behavior mean response time chart | | 1 | |
| 15-37 | Behavior mean response time | | 1 | |
| 15-38 | Business function summary | 1 | | |
| 15-39 | Business function response time summary | 1 | | |
| 15-40 | Business function mean response time by subsystem chart | | 1 | |
| 15-41 | Business function 90th percentile response time chart | | 1 | |
| 15-42 | Business function mean response time chart | | 1 | |
| 15-43 | Business function response time | | 1 | |
| 15-44 | Business function maximum response time by subsystem chart | | 1 | |
| 15-45 | Business function response time details | | 1 | |
| 15-46 | Business function response time parallelism chart | | 1 | |
| 15-47 | Business function response time parallelism | | 1 | |
| 15-48 | Business function throughput summary | 1 | | |
| 15-49 | Business function throughput chart | | 1 | |
| 15-50 | Business function throughput | | 1 | |
| 15-51 | Business function mix chart | | 1 | |
| 15-52 | Client workload summary | 1 | | |
| 15-53 | Client workload interarrival summary | 1 | | |
| 15-54 | Client workload interarrival time chart | | 1 | |
| 15-55 | Client workload interarrival time | | 1 | |
| 15-56 | Client workload response time summary | 1 | | |
| 15-57 | Client workload response time | | 1 | |
| 15-58 | Client workload response time details | | 1 | |
| 15-59 | Client workload response time chart | | 1 | |
| 15-60 | Client workload throughput summary | 1 | | |
| 15-61 | Client workload throughput chart | | 1 | |
| 15-62 | Client workload throughput | | 1 | |
| 15-63 | Client workload executions in progress summary | 1 | | |
| 15-64 | Client workload executions in progress chart | | 1 | |
| 15-65 | Client workload executions in progress | | 1 | |
| 15-66 | Subsystem summary | 1 | | |
| 15-67 | Subsystem population summary | 1 | | |
| 15-68 | Subsystem ending population chart | | 1 | |
| 15-69 | Subsystem population details | | 1 | |
| 15-70 | Subsystem thread utilization summary | 1 | | |
| 15-71 | Subsystem thread utilization chart | | 1 | |

FIG. 15B

| | | | | |
|---|---|---|---|---|
| 15-72 | Subsystem thread utilization | | 1 | |
| 15-73 | Subsystem response time summary | 1 | | |
| 15-74 | Subsystem mean response time chart | | 1 | |
| 15-75 | Subsystem response time | | 1 | |
| 15-76 | Subsystem throughput summary | 1 | | |
| 15-77 | Subsystem throughput chart | | 1 | |
| 15-78 | Subsystem throughput | | 1 | |
| 15-79 | Interconnect summary | 1 | | |
| 15-80 | Interconnect utilization summary | 1 | | |
| 15-81 | Interconnect data utilization chart | | 1 | |
| 15-82 | Interconnect data utilization | | 1 | |
| 15-83 | Interconnect utilization by sender chart | | 1 | |
| 15-84 | Interconnect utilization by sender | | 1 | |
| 15-85 | Interconnect data throughput summary | 1 | | |
| 15-86 | Interconnect mean data throughput chart | | 1 | |
| 15-87 | Interconnect maximum data throughput chart | | 1 | |
| 15-88 | Interconnect data throughput | | 1 | |
| 15-89 | Interconnect response time summary | 1 | | |
| 15-90 | Interconnect mean response time chart | | 1 | |
| 15-91 | Interconnect mean response time | | 1 | |
| 15-92 | Execution environment performance reports | 1 | | |
| 15-93 | Run description and model parameters | 1 | | |
| 15-94 | Run description | | 1 | |
| 15-95 | Model parameters by name | | 1 | |
| 15-96 | Computer summary | | | |
| 15-97 | CPU | 1 | | |
| 15-98 | CPU utilization chart | 1 | | |
| 15-99 | CPU utilization | | 1 | |
| 15-100 | CPU utilization by subsystem chart | | 1 | |
| 15-101 | CPU utilization by subsytem | | 1 | |
| 15-102 | CPU capacity utilization chart | | 1 | |
| 15-103 | CPU capacity utilization | | 1 | |
| 15-104 | CPU capacity utilization by subsystem chart | | 1 | |
| 15-105 | CPU capacity utilization by subystem | | 1 | |
| 15-106 | Disk | 1 | | |
| 15-107 | Nonzero disk utilization | | 1 | |
| 15-108 | Nonzero disk utilization | | 1 | |
| 15-109 | All disk utilization | | 1 | |
| 15-110 | I/O controller | 1 | | |
| 15-111 | Nonzero I/O controller utilization chart | | 1 | |
| 15-112 | Nonzero I/O controller utilization | | 1 | |
| 15-113 | All I/O controller utilization | | 1 | |
| 15-114 | Volume | 1 | | |
| 15-115 | Volume throughput chart | | 1 | |
| 15-116 | Volume throughput | | 1 | |
| 15-117 | Volume response time chart | | 1 | |
| 15-118 | Volume response time | | 1 | |
| 15-119 | Active tasks | 1 | | |
| 15-120 | Computer task manager active tasks chart | | 1 | |
| 15-121 | Computer task manager active tasks | | 1 | |
| 15-122 | Network summary | 1 | | |
| 15-123 | Network utilization summary | 1 | | |
| 15-124 | Network utilization chart | | 1 | |
| 15-125 | Network utilization | | 1 | |
| 15-126 | Network utilization by sender chart | | 1 | |
| 15-127 | Network utilization by sender | | 1 | |
| 15-128 | Network total throughput summary | 1 | | |
| 15-129 | Network mean total throughput chart | | 1 | |
| 15-130 | Network maximum total throughput chart | | 1 | |
| 15-131 | Network total throughput | | 1 | |
| 15-132 | Network data throughput summary | 1 | | |
| 15-133 | Network mean data throughput chart | | 1 | |
| 15-134 | Network maximum data throughput chart | | 1 | |
| 15-135 | Network data throughput | | 1 | |
| 15-136 | Network response time summary | 1 | | |
| 15-137 | Network mean response time chart | | 1 | |
| 15-138 | Network mean response time | | 1 | |
| 15-139 | User-defined statistics summary | 1 | | |
| 15-140 | User-defined continuous statistics | | 1 | |
| 15-141 | User-defined discrete statistics | | 1 | |
| 15-142 | Reports from the Single and Multiple Run PO Reports with BF template | | | |
| 15-143 | How does performance compare to the objectives? | 1 | | 1 |
| 15-144 | Business function response time evaluation chart | | 1 | |
| 15-145 | Business function response time evaluation compared to objective chart | | 1 | |

FIG. 15C

| | | | | |
|---|---|---|---|---|
| 15-146 | Business function response time evaluation | | 1 | |
| 15-147 | CPU capacity utilization evaluation chart | | 1 | |
| 15-148 | CPU capacity utilization evaluation objective chart | | 1 | |
| 15-149 | CPU capacity utilization evaluation | | 1 | |
| 15-150 | Performance objectives working data | 1 | | |
| 15-151 | CPU capacity utilization information (2) | | 1 | |
| 15-152 | What objectives are not satisfied? | 1 | | 1 |
| 15-153 | Unsatisfactory business function response times chart | | 1 | |
| 15-154 | Unsatisfactory business function response time with objective chart | | 1 | |
| 15-155 | Unsatisfactory business function response times | | 1 | |
| 15-156 | Unsatisfactory CPU capacity utilizations chart | | 1 | |
| 15-157 | Unsatisfactory CPU capacity utilizations with objective chart | | 1 | |
| 15-158 | Unsatisfactory CPU capacity utilization | | 1 | |
| 15-159 | Reports from the Single and Multiple Run PO Reports without BF template | | | |
| 15-160 | How does performance compare to the objectives? | 1 | | 1 |
| 15-161 | CPU capacity utilization evaluation chart | | 1 | |
| 15-162 | CPU capacity utilization compared to objective chart | | 1 | |
| 15-163 | CPU capacity utilization evaluation | | 1 | |
| 15-164 | Performance objectives working data | 1 | | |
| 15-165 | CPU capacity utilization information | | 1 | |
| 15-166 | What objectives are not satisfied? | 1 | | 1 |
| 15-167 | Unsatisfactory CPU capacity utilizations chart | | 1 | |
| 15-168 | Unsatisfactory CPU capacity utilizations with objective chart | | 1 | |
| 15-169 | Unsatisfactory CPU capacity utilizations | | 1 | |
| 15-170 | Reports from the Application Profile Report template | | | |
| 15-171 | Run information | | 1 | |
| 15-172 | List of business functions report | | 1 | |
| 15-173 | Response time profile | 1 | | |
| 15-174 | Response time | | 1 | |
| 15-175 | Response time subsystem details | | 1 | |
| 15-176 | Response time table | | 1 | |
| 15-177 | Response time subsystem details table | | 1 | |
| 15-178 | Network profile reports | 1 | | |
| 15-179 | Application turns (visits) | | 1 | |
| 15-180 | Network bytes transmitted | | 1 | |
| 15-181 | Network bytes transmitted subsystem details | | 1 | |
| 15-182 | Application turns (visits) table | | | |
| 15-183 | Network bytes transmitted table | | | |
| 15-184 | Network bytes transmitted chart data | | 1 | |
| 15-185 | CPU profile reports | 1 | | |
| 15-186 | CPU requirements | | 1 | |
| 15-187 | CPU requirements data | | | |
| 15-188 | I/O profile reports | 1 | | |
| 15-189 | I/O bytes transferred | | 1 | |
| 15-190 | I/O bytes transferred subsystem details | | 1 | |
| 15-191 | I/O operations table | | 1 | |
| 15-192 | I/O bytes transferred table | | 1 | |
| 15-193 | I/O bytes transferred chart table | | 1 | |
| 15-194 | Reports from the Business Function Resource Summary template | | | |
| 15-195 | Run information | 1 | | |
| 15-196 | Business function resource summary | 1 | | |
| 15-197 | CPU requirements | | 1 | |
| 15-198 | I/O operations | | 1 | |
| 15-199 | I/O operations subsystem details | | 1 | |
| 15-200 | I/O bytes transferred | | 1 | |
| 15-201 | I/O bytes transferred subsystem details | | 1 | |
| 15-202 | Business function resource summary | | 1 | |
| 15-203 | Load test summary reports | 1 | | |
| 15-204 | Business function thoughput | | 1 | |
| 15-205 | Business function response time | | 1 | |
| 15-206 | Server utilization | | 1 | |
| 15-207 | Server I/O operations per second | | 1 | |
| 15-208 | Server I/O bytes transferred | | 1 | |
| 15-209 | Business function metrics summary table | | 1 | |
| 15-210 | Server metrics summary | | 1 | |
| 15-211 | Business function interarrival time | | 1 | |
| 15-212 | Reports from the Resouce Summary template | | | |
| 15-213 | Run information | | 1 | |
| 15-214 | Business function metrics | 1 | | |
| 15-215 | Business function throughput | | 1 | |
| 15-216 | Business function response time | | 1 | |
| 15-217 | Business function throughput table | | 1 | |
| 15-218 | Business function response time table | | 1 | |
| 15-219 | Server metrics | 1 | | |

FIG. 15D

| | | | | |
|---|---|---|---|---|
| 15-220 | Server utilization | | 1 | |
| 15-221 | Server I/O operations | | 1 | |
| 15-222 | Server I/O bytes transferred | | 1 | |
| 15-223 | Server metrics summary table | | 1 | |
| 15-224 | Other metrics reports | 1 | | |
| 15-225 | Vusers summary | | 1 | |
| 15-226 | Web resource summary | | 1 | |
| 15-227 | Reports from the Transaction summary template | | | |
| 15-228 | Run information | | 1 | |
| 15-229 | List of business functions | | 1 | |
| 15-230 | Response time profile | 1 | | |
| 15-231 | Response time | | 1 | |
| 15-232 | Response time subsystem details | | 1 | |
| 15-233 | Response time transaction details | | 1 | |
| 15-234 | Response time table | | 1 | |
| 15-235 | Response time subsystem details table | | 1 | |
| 15-236 | Network profile reports | 1 | | |
| 15-237 | Application turns (visits) | | 1 | |
| 15-238 | Network bytes transmitted | | 1 | |
| 15-239 | Network bytes transmitted subsystem details | | 1 | |
| 15-240 | Application turns (visits) table | | 1 | |
| 15-241 | Network bytes transmitted table | | 1 | |
| 15-242 | Network bytes transmitted subsystem details table | | 1 | |
| 15-243 | CPU profile reports for Transaction Summaries | 1 | | |
| 15-244 | CPU requirements | | 1 | |
| 15-245 | CPU requirements per business function | | | |
| 15-246 | I/O profile reports for Transaction Summaries | 1 | | |
| 15-247 | I/O bytes transferred | 1 | | |
| 15-248 | I/O bytes transferred subsystem details | 1 | | |
| 15-249 | I/O operations table | 1 | | |
| 15-250 | I/O bytes transferred chart data | 1 | | |
| 15-251 | Transaction statistics | 1 | | |
| 15-252 | Transaction response time details tab;e | 1 | | |
| 15-253 | Transaction request/reply details table | 1 | | |
| 15-254 | Reports from the T1 Run Comparison template | | | |
| 15-255 | Run information | 1 | | |
| 15-256 | Response time comparison | 1 | | |
| 15-257 | Response time | | 1 | |
| 15-258 | Response time subsystem details | | 1 | |
| 15-259 | Response time transaction details | | 1 | |
| 15-260 | Parallelism check | | 1 | |
| 15-261 | Response time table | | 1 | |
| 15-262 | Response time subsystem details table | | 1 | |
| 15-263 | Response time transaction details table | | 1 | |
| 15-264 | Parallelism check table | | 1 | |
| 15-265 | Working tables for response time | 1 | | |
| 15-266 | Business function response time | | 1 | |
| 15-267 | Sum of business function response time details | | 1 | |
| 15-268 | Network bytes comparisons | 1 | | |
| 15-269 | Network request/reply bytes | | 1 | |
| 15-270 | Network bytes details | | 1 | |
| 15-271 | Network bytes | | 1 | |
| 15-272 | Working folder for network bytes | 1 | | |
| 15-273 | Network request/reply bytes | | 1 | |
| 15-274 | Network reply bytes table | | 1 | |
| 15-275 | Network request bytes per subsystem table | | 1 | |
| 15-276 | Network reply bytes per subsystem table | | 1 | |
| 15-277 | Application turns (visits) comparisons | 1 | | |
| 15-278 | Application turns (visits) | | 1 | |
| 15-279 | Application turns (visits) table | | 1 | |
| 15-280 | Reports from the T2 Run Comparison template | | | |
| 15-281 | Run information for T2 comparison | | 1 | |
| 15-282 | Number of vusers for T2 comparison | | 1 | |
| 15-283 | Business function throughput for T2 comparison | 1 | | |
| 15-284 | Business functions throughput | | 1 | |
| 15-285 | Business function throughput details per BF | | 1 | |
| 15-286 | Business function response time for T2 comparison | 1 | | |
| 15-287 | Business function reponse time | | 1 | |
| 15-288 | Business function reponse time details per BF | | 1 | |
| 15-289 | Server utilization for T2 comparison | 1 | | |
| 15-290 | Server utilization | | 1 | |
| 15-291 | Server utilization by server | | 1 | |
| 15-292 | Server utilization details | | 1 | |
| 15-293 | Throughput vs. response time for T2 comparison | 1 | | |

FIG. 15E

| | | | | |
|---|---|---|---|---|
| 15-294 | Report | | 1 | |
| 15-295 | Business function resource usage for T2 comparison | 1 | | |
| 15-296 | CPU time | | 1 | |
| 15-297 | I/O read bytes | | 1 | |
| 15-298 | I/O write bytes | | 1 | |
| 15-299 | Reports from the T3 Run Comparison template | 1 | | |
| 15-300 | Run information for T3 comparison | | | |
| 15-301 | Report | | 1 | |
| 15-302 | Number of vusers for T3 comparison | 1 | | |
| 15-303 | Report | | 1 | |
| 15-304 | Business function throughput for T3 comparison | 1 | | |
| 15-305 | Business function throughput | | 1 | |
| 15-306 | Business function throughput details per BF | | 1 | |
| 15-307 | Business function response time for T3 comparison | 1 | | |
| 15-308 | Business function response time | | 1 | |
| 15-309 | Business function response time per BF | | 1 | |
| 15-310 | Server utilization for T3 comparison | 1 | | |
| 15-311 | Server utilization | | 1 | |
| 15-312 | Server utilization by server | | 1 | |
| 15-313 | Server utilization details | | 1 | |
| 15-314 | Throughput vs. response time for T3 comparison | 1 | | |
| 15-315 | Throughput vs. response time | | 1 | |
| 15-316 | Throughput vs. server utilization | | 1 | |
| 15-317 | Throughput chart | | 1 | |
| 15-318 | Server utilization | | 1 | |
| 15-319 | Reports from the T1 Validation template | | | |
| 15-320 | Run information tables for T1 validation | 1 | | |
| 15-321 | Measured Run | | 1 | |
| 15-322 | Modeled Run | | 1 | |
| 15-323 | Modeled run critique check | 1 | | |
| 15-324 | Is there a significant number of BF executions | | 1 | |
| 15-325 | Is the simulation free of server process contention | | 1 | |
| 15-326 | Application turns validation reports | 1 | | |
| 15-327 | Application turns | | 1 | |
| 15-328 | Response time validation reports | 1 | | |
| 15-329 | Response time | | 1 | |
| 15-330 | Response time subsystem details | | 1 | |
| 15-331 | Response time transaction details | | 1 | |
| 15-332 | Reports from the T2 Validation template | | | |
| 15-333 | Run information tables for T2 validation | 1 | | |
| 15-334 | Measured Run | | 1 | |
| 15-335 | Modeled Run | | 1 | |
| 15-336 | Business function throughput validation reports for T2 | 1 | | |
| 15-337 | Report | | 1 | |
| 15-338 | Server utilization reports for T2 validation | 1 | | |
| 15-339 | CPU utilizations | | | 1 |
| 15-340 | Server utilization validation | | | 1 |
| 15-341 | Business function response time reports for T2 validation | 1 | | |
| 15-342 | Report | | 1 | |
| 15-343 | Reports from the T3 Validation template | | | |
| 15-344 | Run information tables for T3 validation | 1 | | |
| 15-345 | Measured Run | | 1 | |
| 15-346 | Modeled Run | | 1 | |
| 15-347 | Business function throughput validation reports for T3 | 1 | | |
| 15-348 | Report | | 1 | |
| 15-349 | Server utilization reports for T3 validation | 1 | | |
| 15-350 | CPU utilizations | | | 1 |
| 15-351 | Server utilization validation | | | 1 |
| 15-352 | Business function response time reports for T3 validation | 1 | | |
| 15-353 | Report | | 1 | |
| 15-354 | Model Bottlenech Detection Reports | | | |
| 15-355 | Top 5 bottleneck utilizations report | | 1 | |
| 15-356 | Model bottleneck dtection parameters report | | 1 | |

FIG. 16A
16-51
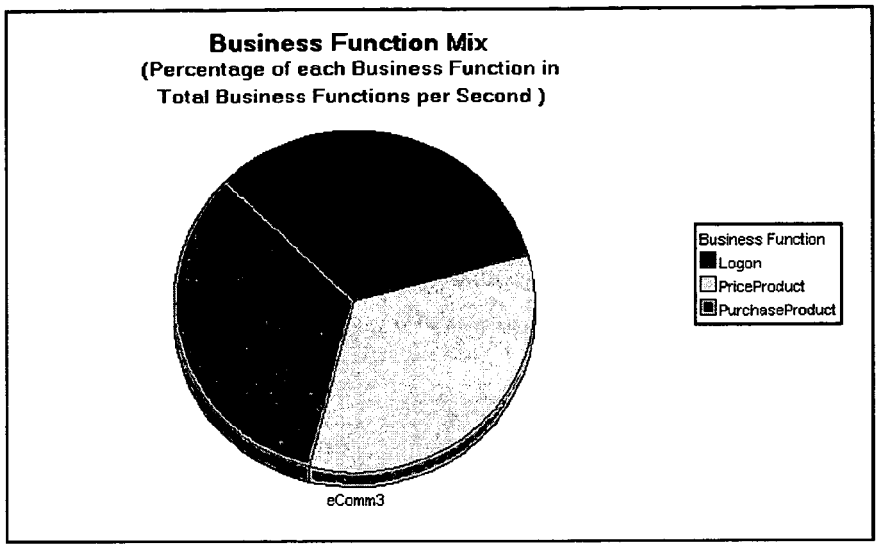
16-145
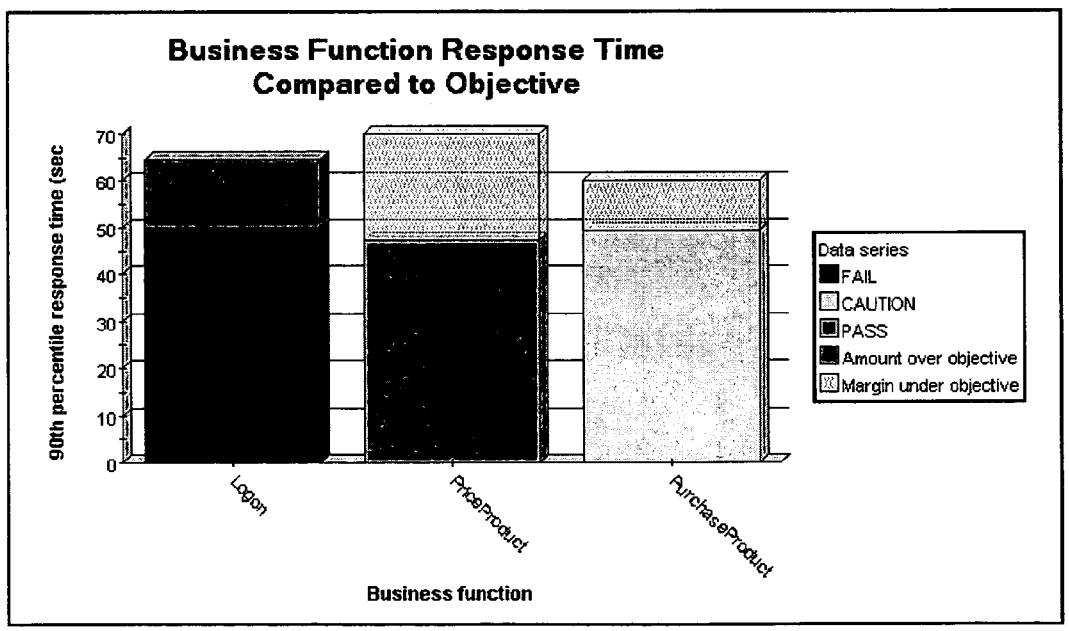

16-146

Business Function Response Time Evaluation

| Business function | 90th percentile response time (sec) | Objective (sec) | Objectives met? |
|---|---|---|---|
| Logon | 64.5 | 50 | |
| PriceProduct | 47.4 | 70 | PASS |
| PurchaseProduct | 49.3 | 60 | CAUTION |

16-181

FIG. 16C
16-258
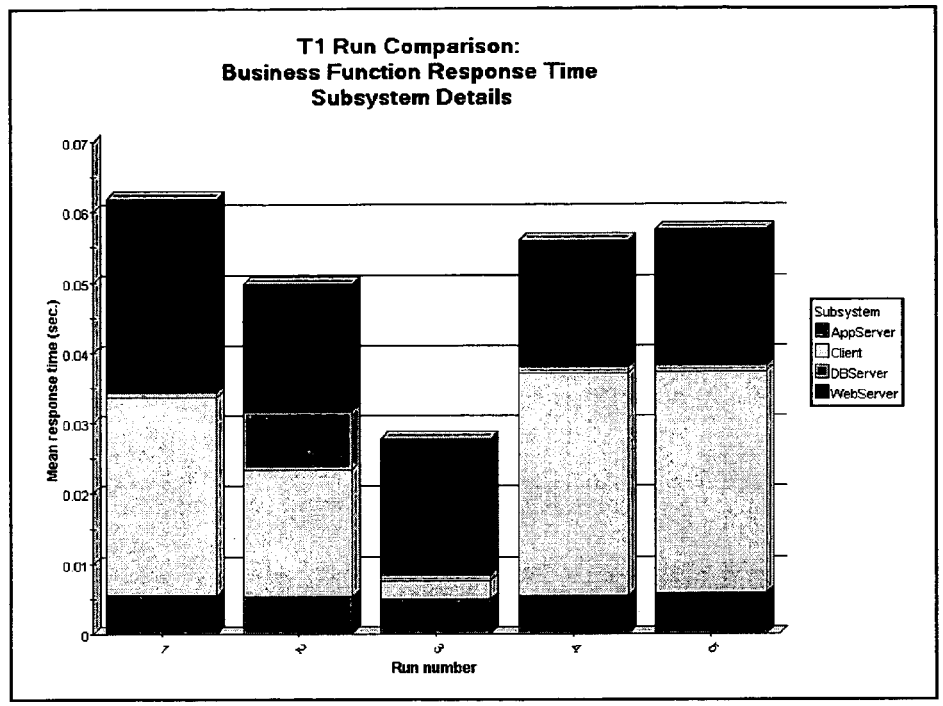
16-316
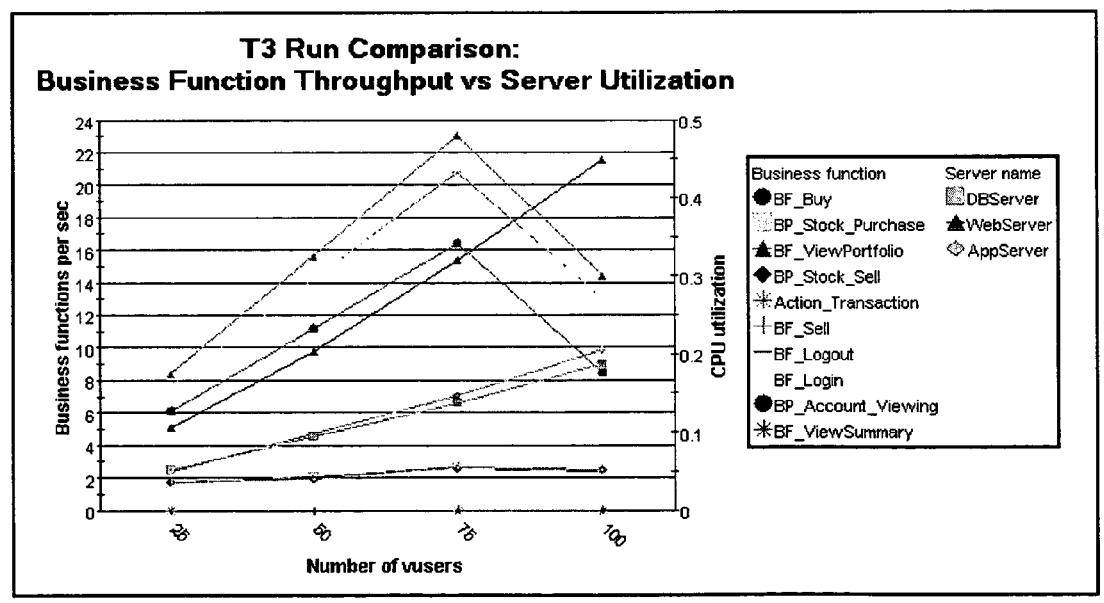

FIG. 17A

Template: Single Run PO Reports with BF.rox — 1000
Folder: How does performance compare to the objectives?
Report: Business function response time compared to objective chart — 1001

```
<?xml version="1.0" encoding="UTF-8"?>
```

Template Version
```
<template version="3.1 11/08/04" name="How does perf compare to obj BF RT compared to obj"
```

A flag indicates the statistical data should be analyzed and certain reports showing performance objectives should be included if there is sufficient data to support the performance objectives and business function template.
```
    includesIPSReports="true" includesPOReports="true">
```

Begin folder "How does performance compare to objectives?"
One or more reports or folders can appear after folder name
```
<folder name="How does performance compare to the objectives?">
```

Report name
This is the unique name for the report. This name appears in the tree view.
```
    <report name="Business function response time compared to objective chart">
```

High level chart type information is given here. Additional chart specification occurs later in the template.
A secondarychartlayout is used to indicate additional chart layout characteristics
such as whether a secondary y axis appears or whether two charts are stacked one above the other.
```
    <chart secondarychartlayout="None" secondarycharttype="9" rotate="false">
```

The table datasourceoption indicates the source data type for the data which underlies this chart.
The table data may come from primary and (optionally) a secondary data source or it may
come from other table reports. In the former case, the data comes from data sources.
In the latter case, the resulting chart is formed from the concatenation of certain rows from existing tables.
```
    <table datasourceoption="datasource" tabletitle="Business function response time compared to objective chart">
```

Begin column definitions
A report has one or more column definitions.
The column definitions show the column name and also whether the columns values
will be taken directly from the data source or whether the column values are the result
of the evaluation of some table function.

Column definition Business Function
```
    <column name="Business Function" width="" isTableNickName="false" isIdColumn="true">
        <headerCell>
            <textField>
                <literalText>Business Function</literalText>
            </textField>
        </headerCell>
        <valueCell>
            <textField>
```
— 1002

Column value for Business Function is taken from the Modeled results statistics component name
```
                <formattedValue valueSpec="ScenarioResults.Statistics.comp_name" formatSpec=""/>
            </textField>
        </valueCell>
    </column>
```

Column definition 90th percentile response (sec)
```
    <column name="90th percentile response (sec)" width="" isTableNickName="false" isIdColumn="false">
        <headerCell>
            <textField>
                <literalText>90th percentile response (sec)</literalText>
            </textField>
        </headerCell>
        <valueCell>
            <textField>
```

Column value for 90th percentile response (sec) comes from the data source Scenario Results, statistics percentile 90
```
                <formattedValue valueSpec="ScenarioResults.Statistics.percentile90" formatSpec=""/>
            </textField>
        </valueCell>
    </column>
```

Column definition Objective
```
    <column name="Objective" width="" isTableNickName="false" isIdColumn="false">
        <headerCell>
```

FIG. 17B

```xml
            <textField>
                <literalText>Objective</literalText>
            </textField>
        </headerCell>
        <valueCell>
            <textField>
```

Column value for Objective evaluates to the data table Performance Objectives threshold value
```xml
                <formattedValue valueSpec="PerformanceObjectives.PerformanceObjectives.threshold" formatSpec=""/>
            </textField>
        </valueCell>
    </column>
```

Column definition Objectives Met?
```xml
    <column name="Objectives Met?" width="" isTableNickName="false" isIdColumn="false">
        <headerCell>
            <textField>
                <literalText>Objectives Met?</literalText>
            </textField>
        </headerCell>
        <valueCell>
            <textField>
```

Table function performanceValueToName parameters returns either Pass,
Caution or Fail depending on the value of Objectives Met?
The section following shows the arguments to this table function.
```xml
                <formattedValue valueSpec="" formatSpec="performanceValueToName(String)">
```

Column value for Objectives Met? is evaluated by calling a table function evaluatePerformance
```xml
                    <expression name="evaluatePerformance(String, Float, Float, Float)" isDefault="false">
                        <parameter isConstantSelected="false">
                            <selectedTable isExternalTableSelected="false" isAdditionalColumns="true" row="Current row">
```

Table function argument stat_name
```xml
                                <selectedColumn name="stat_name"/>
                            </selectedTable>
                        </parameter>
                        <parameter isConstantSelected="false">
                            <selectedTable isExternalTableSelected="false" isAdditionalColumns="false" row="Current row">
```

Table function argument 90th percentile response (sec)
```xml
                                <selectedColumn name="90th percentile response (sec)"/>
                            </selectedTable>
                        </parameter>
                        <parameter isConstantSelected="false">
                            <selectedTable isExternalTableSelected="false" isAdditionalColumns="false" row="Current row">
```

Table function argument Objective
```xml
                                <selectedColumn name="Objective"/>
                            </selectedTable>
                        </parameter>
                        <parameter isConstantSelected="true" constanteValue=""/>
                    </expression>
                </formattedValue>
            </textField>
        </valueCell>
    </column>
```

Column definition PASS
```xml
    <column name="PASS" width="" isTableNickName="false" isIdColumn="false">
        <headerCell>
            <textField>
                <literalText>PASS</literalText>
            </textField>
        </headerCell>
        <valueCell>
            <textField>
                <formattedValue valueSpec="" formatSpec="">
```

A Table function performancePass is used to determine the value of Pass
```xml
                    <expression name="performancePass(String, Float, Float, Float)" isDefault="false">
                        <parameter isConstantSelected="false">
                            <selectedTable isExternalTableSelected="false" isAdditionalColumns="true" row="Current row">
                                <selectedColumn name="stat_name"/>
```

FIG. 17c

```xml
            </selectedTable>
        </parameter>
        <parameter isConstantSelected="false">
            <selectedTable isExternalTableSelected="false" isAdditionalColumns="false" row="Current row">
                <selectedColumn name="90th percentile response (sec)"/>
            </selectedTable>
        </parameter>
        <parameter isConstantSelected="false">
            <selectedTable isExternalTableSelected="false" isAdditionalColumns="false" row="Current row">
                <selectedColumn name="Objective"/>
            </selectedTable>
        </parameter>
        <parameter isConstantSelected="true" constanteValue=""/>
    </expression>
</formattedValue>
            </textField>
        </valueCell>
</column>
```

Column definition CAUTION

```xml
<column name="CAUTION" width="" isTableNickName="false" isIdColumn="false">
    <headerCell>
        <textField>
            <literalText>CAUTION</literalText>
        </textField>
    </headerCell>
    <valueCell>
        <textField>
            <formattedValue valueSpec="" formatSpec="">
```

A Table function performanceCaution is used to determine the value of Caution

```xml
    <expression name="performanceCaution(String, Float, Float, Float)" isDefault="false">
        <parameter isConstantSelected="false">
            <selectedTable isExternalTableSelected="false" isAdditionalColumns="true" row="Current row">
                <selectedColumn name="stat_name"/>
            </selectedTable>
        </parameter>
        <parameter isConstantSelected="false">
            <selectedTable isExternalTableSelected="false" isAdditionalColumns="false" row="Current row">
                <selectedColumn name="90th percentile response (sec)"/>
            </selectedTable>
        </parameter>
        <parameter isConstantSelected="false">
            <selectedTable isExternalTableSelected="false" isAdditionalColumns="false" row="Current row">
                <selectedColumn name="Objective"/>
            </selectedTable>
        </parameter>
        <parameter isConstantSelected="true" constanteValue=""/>
    </expression>
</formattedValue>
            </textField>
        </valueCell>
</column>
```

Column definition FAIL

```xml
<column name="FAIL" width="" isTableNickName="false" isIdColumn="false">
    <headerCell>
        <textField>
            <literalText>FAIL</literalText>
        </textField>
    </headerCell>
    <valueCell>
        <textField>
            <formattedValue valueSpec="" formatSpec="">
```

Fail column values are set by a call to table function testGT
which returns whether the Business Function 90th percentile value is greater than the Objective

```xml
    <expression name="testGT(String, String, String, String)" isDefault="false">
        <parameter isConstantSelected="false">
            <selectedTable isExternalTableSelected="false" isAdditionalColumns="false" row="Current row">
                <selectedColumn name="90th percentile response (sec)"/>
            </selectedTable>
        </parameter>
        <parameter isConstantSelected="false">
```

FIG.17D

```xml
                    <selectedTable isExternalTableSelected="false" isAdditionalColumns="false" row="Current row">
                        <selectedColumn name="Objective"/>
                    </selectedTable>
                </parameter>
                <parameter isConstantSelected="false">
                    <selectedTable isExternalTableSelected="false" isAdditionalColumns="false" row="Current row">
                        <selectedColumn name="Objective"/>
                    </selectedTable>
                </parameter>
                <parameter isConstantSelected="true" constanteValue=""/>
            </expression>
        </formattedValue>
    </textField>
</valueCell>
</column>
```

Column definition Margin under objective
```xml
<column name="Margin under objective" width="" isTableNickName="false" isIdColumn="false">
    <headerCell>
        <textField>
            <literalText>Margin under objective</literalText>
        </textField>
    </headerCell>
    <valueCell>
        <textField>
            <formattedValue valueSpec="" formatSpec="">
```

A Table function positiveDifference determines the value for Margin under the objective
```xml
            <expression name="positiveDifference(Float, Float)" isDefault="false">
                <parameter isConstantSelected="false">
                    <selectedTable isExternalTableSelected="false" isAdditionalColumns="false" row="Current row">
                        <selectedColumn name="Objective"/>
                    </selectedTable>
                </parameter>
                <parameter isConstantSelected="false">
                    <selectedTable isExternalTableSelected="false" isAdditionalColumns="false" row="Current row">
                        <selectedColumn name="90th percentile response (sec)"/>
                    </selectedTable>
                </parameter>
            </expression>
        </formattedValue>
    </textField>
</valueCell>
</column>
```

Column definition Amount over objective
```xml
<column name="Amount over objective" width="" isTableNickName="false" isIdColumn="false">
    <headerCell>
        <textField>
            <literalText>Amount over objective</literalText>
        </textField>
    </headerCell>
    <valueCell>
        <textField>
            <formattedValue valueSpec="" formatSpec="">
```

A Table function positiveDifference determines the value of Amount over objective
```xml
            <expression name="positiveDifference(Float, Float)" isDefault="false">
                <parameter isConstantSelected="false">
                    <selectedTable isExternalTableSelected="false" isAdditionalColumns="false" row="Current row">
                        <selectedColumn name="90th percentile response (sec)"/>
                    </selectedTable>
                </parameter>
                <parameter isConstantSelected="false">
                    <selectedTable isExternalTableSelected="false" isAdditionalColumns="false" row="Current row">
                        <selectedColumn name="Objective"/>
                    </selectedTable>
                </parameter>
            </expression>
        </formattedValue>
    </textField>
</valueCell>
</column>
```
End column definitions

FIG. 17E

Table options to sort ascending or descending
```
<tableViewSort sortType="descending">
    <viewSortColumn colName="90th percentile response (sec)" sortAscending="false"/>
    <viewSortColumn colName="Business Function" sortAscending="true"/>
</tableViewSort>
<transforms view="horizontal">
```

Begin Transform type Edit
The Edit transform akes adjustments to the headings that will be displayed in the resulting
table or chart view. There are other transform types available including Subtotal and Pivot.
Subtotal performs a grouping of the rows of the table which serves to aggregate the data
based on some set of id columns used to determine which rows are aggregated
and some table function which is used to generate the resulting aggregated values.
Pivot similar to the standard pivot transform.

⟵ 1010

```
            <transform type="edit">
```

Transform column name Business Function to Business function
```
            <transformColumn transformColumnName="Business Function" action="Business function" format=""/>
            <transformColumn transformColumnName="90th percentile response (sec)" action="90th percentile response (sec)" format=""/>
            <transformColumn transformColumnName="Objective" action="Objective" format=""/>
            <transformColumn transformColumnName="Objectives Met?" action="Objectives Met?" format="">
                <expression name="evaluatePerformance(String, Float, Float, Float)" isDefault="false">
                    <parameter isConstantSelected="false">
                        <selectedTable isExternalTableSelected="false" isAdditionalColumns="true" row="Current row">
                            <selectedColumn name="stat_name"/>
                        </selectedTable>
                    </parameter>
                    <parameter isConstantSelected="false">
                        <selectedTable isExternalTableSelected="false" isAdditionalColumns="false" row="Current row">
                            <selectedColumn name="90th percentile response (sec)"/>
                        </selectedTable>
                    </parameter>
                    <parameter isConstantSelected="false">
                        <selectedTable isExternalTableSelected="false" isAdditionalColumns="false" row="Current row">
                            <selectedColumn name="Objective"/>
                        </selectedTable>
                    </parameter>
                    <parameter isConstantSelected="true" constanteValue=""/>
                </expression>
            </transformColumn>
            <transformColumn transformColumnName="PASS" action="PASS" format="">
                <expression name="performancePass(String, Float, Float, Float)" isDefault="false">
                    <parameter isConstantSelected="false">
                        <selectedTable isExternalTableSelected="false" isAdditionalColumns="true" row="Current row">
                            <selectedColumn name="stat_name"/>
                        </selectedTable>
                    </parameter>
                    <parameter isConstantSelected="false">
                        <selectedTable isExternalTableSelected="false" isAdditionalColumns="false" row="Current row">
                            <selectedColumn name="90th percentile response (sec)"/>
                        </selectedTable>
                    </parameter>
                    <parameter isConstantSelected="false">
                        <selectedTable isExternalTableSelected="false" isAdditionalColumns="false" row="Current row">
                            <selectedColumn name="Objective"/>
                        </selectedTable>
                    </parameter>
                    <parameter isConstantSelected="true" constanteValue=""/>
                </expression>
            </transformColumn>
            <transformColumn transformColumnName="CAUTION" action="CAUTION" format="">
                <expression name="performanceCaution(String, Float, Float, Float)" isDefault="false">
                    <parameter isConstantSelected="false">
                        <selectedTable isExternalTableSelected="false" isAdditionalColumns="true" row="Current row">
                            <selectedColumn name="stat_name"/>
                        </selectedTable>
                    </parameter>
                    <parameter isConstantSelected="false">
                        <selectedTable isExternalTableSelected="false" isAdditionalColumns="false" row="Current row">
                            <selectedColumn name="90th percentile response (sec)"/>
                        </selectedTable>
                    </parameter>
                    <parameter isConstantSelected="false">
```

FIG. 17F

```xml
            <selectedTable isExternalTableSelected="false" isAdditionalColumns="false" row="Current row">
                <selectedColumn name="Objective"/>
            </selectedTable>
        </parameter>
        <parameter isConstantSelected="true" constanteValue=""/>
    </expression>
</transformColumn>
<transformColumn transformColumnName="FAIL" action="FAIL" format="">
    <expression name="testGT(String, String, String, String)" isDefault="false">
        <parameter isConstantSelected="false">
            <selectedTable isExternalTableSelected="false" isAdditionalColumns="false" row="Current row">
                <selectedColumn name="90th percentile response (sec)"/>
            </selectedTable>
        </parameter>
        <parameter isConstantSelected="false">
            <selectedTable isExternalTableSelected="false" isAdditionalColumns="false" row="Current row">
                <selectedColumn name="Objective"/>
            </selectedTable>
        </parameter>
        <parameter isConstantSelected="false">
            <selectedTable isExternalTableSelected="false" isAdditionalColumns="false" row="Current row">
                <selectedColumn name="Objective"/>
            </selectedTable>
        </parameter>
        <parameter isConstantSelected="true" constanteValue=""/>
    </expression>
</transformColumn>
<transformColumn transformColumnName="Margin under objective" action="Margin under objective" format="">
    <expression name="positiveDifference(Float, Float)" isDefault="false">
        <parameter isConstantSelected="false">
            <selectedTable isExternalTableSelected="false" isAdditionalColumns="false" row="Current row">
                <selectedColumn name="Objective"/>
            </selectedTable>
        </parameter>
        <parameter isConstantSelected="false">
            <selectedTable isExternalTableSelected="false" isAdditionalColumns="false" row="Current row">
                <selectedColumn name="90th percentile response (sec)"/>
            </selectedTable>
        </parameter>
    </expression>
</transformColumn>
<transformColumn transformColumnName="Amount over objective" action="Amount over objective" format="">
    <expression name="positiveDifference(Float, Float)" isDefault="false">
        <parameter isConstantSelected="false">
            <selectedTable isExternalTableSelected="false" isAdditionalColumns="false" row="Current row">
                <selectedColumn name="90th percentile response (sec)"/>
            </selectedTable>
        </parameter>
        <parameter isConstantSelected="false">
            <selectedTable isExternalTableSelected="false" isAdditionalColumns="false" row="Current row">
                <selectedColumn name="Objective"/>
            </selectedTable>
        </parameter>
    </expression>
</transformColumn>
        </transform>
    </transforms>
```

End Transform type Edit

Query table for the Primary data table Modeler Results
```xml
            <query table="ScenarioResults.Statistics">
```
⟵ 1012

Simple Query for selected statistics
```xml
            <simpleQuery>
                <simpleFilter field="component">
                    <fieldValue>BF</fieldValue>
                </simpleFilter>
                <simpleFilter field="subcomponent">
                    <fieldValue/>
                </simpleFilter>
                <simpleFilter field="stat_name">
                    <fieldValue>response_time</fieldValue>
                </simpleFilter>
                <simpleFilter field="by_comp1">
```

FIG. 17G

```
            <fieldValue/>
          </simpleFilter>
          <simpleFilter field="by_comp2">
            <fieldValue/>
          </simpleFilter>
          <simpleFilter field="class" matchNotEquals="true">
            <fieldValue/>
          </simpleFilter>
        </simpleQuery>
```

Secondary data table Performance Objectives
All the rows from the secondary data table are available for a join operation
with the primary table.

```
        <secondaryTables>
          <tableName>PerformanceObjectives.PerformanceObjectives</tableName>
        </secondaryTables>
      </query>
```

One or more Table filters are applied that filter the data before any transforms are applied.
This shows that the Objectives Met? column values are filtered such that
certain values are excluded. Any values that are less than or equal to 2 are excluded.

```
      <tabletransformer>
        <tablefilters>
          <matchFilter columnName="Objectives Met?" comparator="LE" referenceValue="2" isExclusion="false"/>
        </tablefilters>
      </tabletransformer>
    </table>
```

Begin Chart Layout Properties

Columns used for Y values
```
        <columnUsage column="Business Function" usage="xValue"/>
        <columnUsage column="FAIL" usage="yValue"/>
        <columnUsage column="CAUTION" usage="yValue"/>
        <columnUsage column="PASS" usage="yValue"/>
        <columnUsage column="Amount over objective" usage="yValue"/>
        <columnUsage column="Margin under objective" usage="yValue"/>
```
Begin Chart Parameters for third party charting package
```
        <chartHTML><PARAM NAME="background" VALUE="white">
<PARAM NAME="border" VALUE="line|black|2|false">
<PARAM NAME="header.text" VALUE="<html><center>Business Function Response Time<p>Compared to Objective</center></
<PARAM NAME="header.horizontalAlignment" VALUE="Center">
<PARAM NAME="header.font" VALUE="MS Sans Serif-BOLD-24">
<PARAM NAME="header.visible" VALUE="true">
<PARAM NAME="footer.text" VALUE="Date - Author - Company - Security Classification">
<PARAM NAME="footer.visible" VALUE="true">
<PARAM NAME="footer.border" VALUE="empty|0|0|0|0">
<PARAM NAME="legend.type" VALUE="Grid">
<PARAM NAME="legend.background" VALUE="white">
<PARAM NAME="legend.opaque" VALUE="false">
<PARAM NAME="legend.visible" VALUE="true">
<PARAM NAME="legend.border" VALUE="line|black|2|false">
<PARAM NAME="chartArea.depth" VALUE="8">
<PARAM NAME="chartArea.elevation" VALUE="8">
<PARAM NAME="chartArea.rotation" VALUE="8">
<PARAM NAME="chartArea.angleUnit" VALUE="DEGREES">
<PARAM NAME="chartArea.background" VALUE="white">
<PARAM NAME="chartArea.opaque" VALUE="true">
<PARAM NAME="chartArea.plotArea.background" VALUE="white">
<PARAM NAME="chartArea.plotArea.right" VALUE="36">
<PARAM NAME="xaxis.annotationRotation" VALUE="Other">
<PARAM NAME="xaxis.annotationRotationAngle" VALUE="45.0">
<PARAM NAME="xaxis.annotationMethod" VALUE="Point_Labels">
<PARAM NAME="xaxis.placementAxis" VALUE="yaxis">
<PARAM NAME="xaxis.background" VALUE="white">
<PARAM NAME="xaxis.title.placement" VALUE="South">
<PARAM NAME="xaxis.title.text" VALUE="Business function">
<PARAM NAME="xaxis.title.font" VALUE="MS Sans Serif-BOLD-16">
<PARAM NAME="xaxis.title.background" VALUE="white">
<PARAM NAME="xaxis.title.visible" VALUE="true">
<PARAM NAME="xaxis.grid.color" VALUE="black">
<PARAM NAME="yaxis.grid.visible" VALUE="true">
<PARAM NAME="yaxis.background" VALUE="white">
<PARAM NAME="yaxis.title.placement" VALUE="West">
```

FIG. 17H

```
<PARAM NAME="yaxis.title.text" VALUE="FAIL - CAUTION - PASS - Amount over objective - Margin under objective">
<PARAM NAME="yaxis.title.rotation" VALUE="270">
<PARAM NAME="yaxis.title.font" VALUE="MS Sans Serif-BOLD-16">
<PARAM NAME="yaxis.title.background" VALUE="white">
<PARAM NAME="yaxis.title.visible" VALUE="true">
<PARAM NAME="yaxis.grid.color" VALUE="black">
<PARAM NAME="data.chartType" VALUE="STACKING_BAR">
<PARAM NAME="data.holeValue" VALUE="-Infinity">
<PARAM NAME="data.name" VALUE="Data series">
<PARAM NAME="data.line.color" VALUE="black">
<PARAM NAME="data.series1.label" VALUE="FAIL">
<PARAM NAME="data.series1.line.color" VALUE="0-95-153">
<PARAM NAME="data.series1.fill.color" VALUE="153-0-0">
<PARAM NAME="data.series1.symbol.color" VALUE="0-95-153">
<PARAM NAME="data.series1.symbol.shape" VALUE="Dot">
<PARAM NAME="data.series2.label" VALUE="CAUTION">
<PARAM NAME="data.series2.line.color" VALUE="black">
<PARAM NAME="data.series2.fill.color" VALUE="240-228-66">
<PARAM NAME="data.series2.symbol.color" VALUE="black">
<PARAM NAME="data.series2.symbol.shape" VALUE="Box">
<PARAM NAME="data.series3.label" VALUE="PASS">
<PARAM NAME="data.series3.line.color" VALUE="0-222-53">
<PARAM NAME="data.series3.fill.color" VALUE="0-222-53">
<PARAM NAME="data.series3.symbol.color" VALUE="0-222-53">
<PARAM NAME="data.series3.symbol.shape" VALUE="Triangle">
<PARAM NAME="data.series4.label" VALUE="Amount over objective">
<PARAM NAME="data.series4.line.color" VALUE="255-0-51">
<PARAM NAME="data.series4.line.pattern" VALUE="None">
<PARAM NAME="data.series4.line.width" VALUE="4">
<PARAM NAME="data.series4.fill.color" VALUE="255-0-51">
<PARAM NAME="data.series4.fill.background" VALUE="lightGray">
<PARAM NAME="data.series4.symbol.color" VALUE="153-0-0">
<PARAM NAME="data.series4.symbol.shape" VALUE="Diamond">
<PARAM NAME="data.series5.label" VALUE="Margin under objective">
<PARAM NAME="data.series5.line.color" VALUE="85-180-233">
<PARAM NAME="data.series5.fill.color" VALUE="204-204-204">
<PARAM NAME="data.series5.fill.pattern" VALUE="Per_50">
<PARAM NAME="data.series5.symbol.color" VALUE="85-180-233">
<PARAM NAME="data.series5.symbol.shape" VALUE="Star">
<PARAM NAME="data.series6.label" VALUE="5">
<PARAM NAME="data.series6.line.color" VALUE="204-121-167">
<PARAM NAME="data.series6.fill.color" VALUE="204-121-167">
<PARAM NAME="data.series6.symbol.color" VALUE="204-121-167">
<PARAM NAME="data.series6.symbol.shape" VALUE="Vert_Line">
<PARAM NAME="data.series7.label" VALUE="6">
<PARAM NAME="data.series7.line.color" VALUE="0-158-117">
<PARAM NAME="data.series7.fill.color" VALUE="0-158-117">
<PARAM NAME="data.series7.symbol.color" VALUE="0-158-117">
<PARAM NAME="data.series7.symbol.shape" VALUE="Horiz_Line">
<PARAM NAME="data.series8.label" VALUE="7">
<PARAM NAME="data.series8.line.color" VALUE="204-255-255">
<PARAM NAME="data.series8.fill.color" VALUE="204-255-255">
<PARAM NAME="data.series8.fill.pattern" VALUE="Stripe_45">
<PARAM NAME="data.series8.fill.background" VALUE="0-95-153">
<PARAM NAME="data.series8.symbol.color" VALUE="204-255-255">
<PARAM NAME="data.series8.symbol.shape" VALUE="Horiz_Line">
<PARAM NAME="data.series9.label" VALUE="8">
<PARAM NAME="data.series9.line.color" VALUE="red">
<PARAM NAME="data.series9.fill.color" VALUE="red">
<PARAM NAME="data.series9.fill.pattern" VALUE="Stripe_45">
<PARAM NAME="data.series9.fill.background" VALUE="240-228-66">
<PARAM NAME="data.series9.symbol.color" VALUE="red">
<PARAM NAME="data.series9.symbol.shape" VALUE="Dot">
<PARAM NAME="data.series10.label" VALUE="9">
<PARAM NAME="data.series10.line.color" VALUE="magenta">
<PARAM NAME="data.series10.fill.color" VALUE="black">
<PARAM NAME="data.series10.fill.pattern" VALUE="Stripe_45">
<PARAM NAME="data.series10.fill.background" VALUE="0-222-53">
<PARAM NAME="data.series10.symbol.color" VALUE="magenta">
<PARAM NAME="data.series10.symbol.shape" VALUE="Star">
<PARAM NAME="data.series11.label" VALUE="10">
<PARAM NAME="data.series11.line.color" VALUE="black">
<PARAM NAME="data.series11.fill.color" VALUE="255-204-204">
<PARAM NAME="data.series11.fill.pattern" VALUE="Stripe_45">
```

FIG. 17 I

```
<PARAM NAME="data.series11.fill.background" VALUE="153-0-0">
<PARAM NAME="data.series11.symbol.color" VALUE="black">
<PARAM NAME="data.series11.symbol.shape" VALUE="Dot">
<PARAM NAME="data.series12.label" VALUE="11">
<PARAM NAME="data.series12.line.color" VALUE="0-0-102">
<PARAM NAME="data.series12.fill.color" VALUE="0-0-102">
<PARAM NAME="data.series12.fill.pattern" VALUE="Stripe_45">
<PARAM NAME="data.series12.fill.background" VALUE="85-180-233">
<PARAM NAME="data.series12.symbol.color" VALUE="0-0-102">
<PARAM NAME="data.series12.symbol.shape" VALUE="Box">
<PARAM NAME="data.series13.label" VALUE="12">
<PARAM NAME="data.series13.line.color" VALUE="204-121-167">
<PARAM NAME="data.series13.fill.color" VALUE="51-0-0">
<PARAM NAME="data.series13.fill.pattern" VALUE="Stripe_45">
<PARAM NAME="data.series13.fill.background" VALUE="204-121-167">
<PARAM NAME="data.series13.symbol.color" VALUE="204-121-167">
<PARAM NAME="data.series13.symbol.shape" VALUE="Box">
<PARAM NAME="data.series14.label" VALUE="13">
<PARAM NAME="data.series14.line.color" VALUE="0-158-117">
<PARAM NAME="data.series14.fill.color" VALUE="0-51-51">
<PARAM NAME="data.series14.fill.pattern" VALUE="Stripe_45">
<PARAM NAME="data.series14.fill.background" VALUE="0-158-117">
<PARAM NAME="data.series14.symbol.color" VALUE="0-158-117">
<PARAM NAME="data.series14.symbol.shape" VALUE="Box">
<PARAM NAME="data.series15.label" VALUE="14">
<PARAM NAME="data.series15.line.color" VALUE="blue">
<PARAM NAME="data.series15.fill.color" VALUE="204-255-255">
<PARAM NAME="data.series15.fill.pattern" VALUE="Horiz_Stripe">
<PARAM NAME="data.series15.fill.background" VALUE="0-95-153">
<PARAM NAME="data.series15.symbol.color" VALUE="blue">
<PARAM NAME="data.series15.symbol.shape" VALUE="Star">
<PARAM NAME="data.series16.label" VALUE="15">
<PARAM NAME="data.series16.line.color" VALUE="lightGray">
<PARAM NAME="data.series16.fill.color" VALUE="red">
<PARAM NAME="data.series16.fill.pattern" VALUE="Horiz_Stripe">
<PARAM NAME="data.series16.fill.background" VALUE="240-228-66">
<PARAM NAME="data.series16.symbol.color" VALUE="lightGray">
<PARAM NAME="data.series16.symbol.shape" VALUE="Vert_Line">
<PARAM NAME="data.series17.label" VALUE="16">
<PARAM NAME="data.series17.line.color" VALUE="magenta">
<PARAM NAME="data.series17.fill.color" VALUE="black">
<PARAM NAME="data.series17.fill.pattern" VALUE="Horiz_Stripe">
<PARAM NAME="data.series17.fill.background" VALUE="0-222-53">
<PARAM NAME="data.series17.symbol.color" VALUE="magenta">
<PARAM NAME="data.series17.symbol.shape" VALUE="Horiz_Line">
<PARAM NAME="data.series18.label" VALUE="17">
<PARAM NAME="data.series18.line.color" VALUE="black">
<PARAM NAME="data.series18.fill.color" VALUE="255-204-204">
<PARAM NAME="data.series18.fill.pattern" VALUE="Horiz_Stripe">
<PARAM NAME="data.series18.fill.background" VALUE="153-0-0">
<PARAM NAME="data.series18.symbol.color" VALUE="black">
<PARAM NAME="data.series18.symbol.shape" VALUE="Dot">
<PARAM NAME="data.series19.label" VALUE="18">
<PARAM NAME="data.series19.line.color" VALUE="0-0-102">
<PARAM NAME="data.series19.fill.color" VALUE="0-0-102">
<PARAM NAME="data.series19.fill.pattern" VALUE="Horiz_Stripe">
<PARAM NAME="data.series19.fill.background" VALUE="85-180-233">
<PARAM NAME="data.series19.symbol.color" VALUE="0-0-102">
<PARAM NAME="data.series19.symbol.shape" VALUE="Box">
<PARAM NAME="data.series20.label" VALUE="19">
<PARAM NAME="data.series20.line.color" VALUE="204-121-167">
<PARAM NAME="data.series20.fill.color" VALUE="51-0-0">
<PARAM NAME="data.series20.fill.pattern" VALUE="Horiz_Stripe">
<PARAM NAME="data.series20.fill.background" VALUE="204-121-167">
<PARAM NAME="data.series20.symbol.color" VALUE="204-121-167">
<PARAM NAME="data.series20.symbol.shape" VALUE="Box">
<PARAM NAME="data.series21.label" VALUE="20">
<PARAM NAME="data.series21.line.color" VALUE="0-158-117">
<PARAM NAME="data.series21.fill.color" VALUE="0-51-51">
<PARAM NAME="data.series21.fill.pattern" VALUE="Horiz_Stripe">
<PARAM NAME="data.series21.fill.background" VALUE="0-158-117">
<PARAM NAME="data.series21.symbol.color" VALUE="0-158-117">
<PARAM NAME="data.series21.symbol.shape" VALUE="Box">
<PARAM NAME="data.series22.label" VALUE="21">
```

FIG. 17J

```
<PARAM NAME="data.series22.line.color" VALUE="cyan">
<PARAM NAME="data.series22.fill.color" VALUE="cyan">
<PARAM NAME="data.series22.symbol.color" VALUE="cyan">
<PARAM NAME="data.series22.symbol.shape" VALUE="Box">
<PARAM NAME="data.series23.label" VALUE="22">
<PARAM NAME="data.series23.line.color" VALUE="black">
<PARAM NAME="data.series23.fill.color" VALUE="black">
<PARAM NAME="data.series23.symbol.color" VALUE="black">
<PARAM NAME="data.series23.symbol.shape" VALUE="Triangle">
<PARAM NAME="data.series24.label" VALUE="23">
<PARAM NAME="data.series24.line.color" VALUE="pink">
<PARAM NAME="data.series24.fill.color" VALUE="pink">
<PARAM NAME="data.series24.symbol.color" VALUE="pink">
<PARAM NAME="data.series24.symbol.shape" VALUE="Diamond">
</chartHTML>
End Chart Parameters for third party charting package
Begin Chart View Settings
        <chartView>
Instance Filter sort ascending or descending
        <instanceFilter>
          <instanceFilterPanelTop visible="false"/>
          <instanceFilterPanelBottom visible="false"/>
          <dataSeries>
            <seriesFilter field="series"/>
            <seriesSort alpha="false" desc="false" byValue="false" byProperty="true"/>
          </dataSeries>
          <xAxis>
            <xAxisFilter field="Business function"/>
            <xAxisSort alpha="true" desc="false" byValue="false"/>
          </xAxis>
        </instanceFilter>
Begin Advanced Chart Properties
        <AdvanceChartProp>
          <xAxisValueMap/>
          <visibility title="true" footer="false" legend="true" chartView="true" instanceFilter="false"/>
          <chart3DView depth="8" elevation="8" rotation="8"/>
          <footer text="Date - Author - Company - Security Classification"/>
          <xAxis title="Business function" lblOrientation="4"/>
          <yAxis title="90th percentile response time (sec)"/>
          <legend anchor="1" orientation="1"/>
          <sameYAxesScale>false</sameYAxesScale>
          <dataSeries>
            <primaryDS>
              <series name="PASS" fillClr="0-222-53" fillPattern="1" lineClr="0-222-53" lineStyle="1" lineWidth="1" symbolClr="0-222-53" symbolShape
              <series name="Margin under objective" fillClr="204-204-204" fillPattern="3" lineClr="85-180-233" lineStyle="1" lineWidth="1" symbolClr="8
              <series name="FAIL" fillClr="153-0-0" fillPattern="1" lineClr="0-95-153" lineStyle="1" lineWidth="1" symbolClr="0-95-153" symbolShape="
              <series name="CAUTION" fillClr="240-228-66" fillPattern="1" lineClr="0-0-0" lineStyle="1" lineWidth="1" symbolClr="0-0-0" symbolShape
              <series name="Amount over objective" fillClr="255-0-51" fillBackgroundClr="192-192-192" fillPattern="1" lineClr="255-0-51" lineStyle="0" l
            </primaryDS>
          </dataSeries>
          <DefaultProperties>
            <Y0GridSpace>10.0</Y0GridSpace>
            <X0Scale_Min>-0.5</X0Scale_Min>
            <X0Scale_Max>4.5</X0Scale_Max>
            <Y0Scale_Min>0.0</Y0Scale_Min>
            <Y0Scale_Max>50.0</Y0Scale_Max>
          </DefaultProperties>
        </AdvanceChartProp>
End Advanced Chart Properties
        </chartView>
End Chart View Settings
    </chart>
      </report>
  </folder>
</template>
```

METHOD AND APPARATUS FOR ORGANIZING, VISUALIZING AND USING MEASURED OR MODELED SYSTEM STATISTICS

CROSS-REFERENCE TO RELATED APPLICATIONS

This application claims priority to U.S. Provisional Application No. 60/579,456, entitled "Method and Apparatus for Acquiring and Organizing Simulation Statistics," filed Jun. 14, 2004; U.S. Provisional Application No. 60/579,306, entitled "Method and Apparatus for Translating Objects Into Templates," filed Jun. 14, 2004; U.S. Provisional Application No. 60/579,305, entitled "Method and Apparatus for Automatic Selection of Data and Table Population," filed Jun. 14, 2004; and U.S. Provisional Application No. 60/579,329, entitled "Method and Apparatus for Joining Data and Building Tables," filed Jun. 14, 2004.

TECHNICAL FIELD OF THE INVENTION

The technical field of this invention is software, namely, software to organize and display performance data from complex computer networks.

BACKGROUND OF THE INVENTION

The performance of business systems in the global economy is an area of considerable interest as businesses become more disperse and applications become more complex. Decisions must be made rapidly and data systems must remain reliable and available. Reliability and performance can be a considerable issue in the face of rapid system or application scaling such as would be experienced in a merger of two large corporations or in an onset of an IT outsourcing contract.

A goal of modern IT performance engineers is to optimize business applications on quite large and complex systems with perhaps many thousands of nodes that are often widely geographically dispersed. In order to meet this goal, a performance engineer might design a test environment with actual equipment running actual business applications to be tested but on a much reduced scale from a "production" environment. The performance within the test environment is carefully measured and scaled and the performance engineer would then like to take that data and project how the business application will perform in the more complex production or projected environment. In other situations, a system may be overly stressed, with such low business application performance that the situation is detrimental to the function of the corporation. To relieve the situation, the performance engineer may be asked to troubleshoot the problem quickly. To accommodate the performance engineer a tool for quickly organizing appropriate and existing test data into a form that will answer key system questions is essential. Furthermore, rapidly visualizing the answer to the key system question in a form that optimizes the performance engineer's ability to draw conclusions and make decisions has considerable value in the art of the field.

FIG. 1 shows an example of a test network to investigate application and network performance. This example includes a network of servers, workstations, business applications, data storage devices, test devices and IP network connections between them shown as LAN 115 and Internet 105. The network of servers is comprised of application server 125 connected to LAN 115 which runs business, engineering or research applications, database server 120 connected to LAN 115 and which is a local database that organizes information of interest to the business, storage server 135 connected to LAN 115 and which holds data storage 138 that feeds the servers and to which data is backed up from the servers, remote database server 190 connected to LAN 115 via the Internet 105 and remote LAN 117 and which is geographically remote from database server 120 and serves a similar function to the local server but may house different pieces of information from different business units, and remote storage server 150 connected to LAN 115 via the Internet 105 and remote LAN 116 and which is used to keep a synchronous or asynchronous copy of the local data storage 130 to remote storage 155. A workstation 130 is shown which runs a first application client 101 and a second application client 102; workstation 130 is also connected to LAN 115. Interspersed between the LAN 115 and the various servers are network sniffer devices 140, 145, 150 and 160. There is a network sniffer device 170 between LAN 115 and the Internet 105. Network sniffer devices 175 and 185, are respectively connected between the remote data storage 155 and remote storage server 150 and between the local data storage 138 and the storage server 135. There is also a network sniffer device 180 between the Internet 105 and remote database server 190. The network sniffers function to examine data packets as they traverse the network looking for a match and logging a timestamp for each match. They will also count the number of packets that match in a given time frame and perform other such functions related to network packet timing.

There are three interesting classes of test to run on this network. The first class of test, test1, captures a network trace of an instance of a business application to establish the flow of the business process through the network. For example, application client 101 may launch a web application from workstation 130 that will require various unknown network resources. Test1 will ultimately trace the paths that the application will take through the network to find the resources. Reports from test1 will typically list the various network resources and response times.

The second class of test, test2, captures resource usage of various components of the network. For example, application client 102 utilizes workstation 130, application server 125, database server 120 and storage server 135 and remote storage server 150 to create and store a set of business transactions. Test2 will correlate the usage data on the various devices in the network to the business application run to prepare a set of resource usage reports. For example, CPU utilization on Workstation 130 would be included in that report. Fairly complex reports can be created by test2 where the business function is loaded repeatedly to examine network and resource utilization under scaling.

The third class of test, test3 captures resource usage and other correlated information from various components of the network when multiple business applications are running. For example, 3 instances of the application client 101 and 5 instances of application client 102 are run at the same time. Even more complex reports are generated by test3 tests that look at resource usage and scaling in a mixed environment.

Measured data from tests like those described can be utilized in simulation and modeling programs to predict network or system performance in different environments than the one on which the measurements were made. The performance engineer with these simulation and modeling programs can generate vast amounts of data about his network or system—modeled data that can be used to rapidly solve performance problems given the right tools to organize the data.

Several recurring questions routinely arise in analysis of system performance data and in predictive scenarios. For example, questions that could be asked in such a test environment, such as "What are the bottlenecks?", "Are the performance objectives being met?", or, "Will the performance objectives be met when the number of clients on the network scales to 10,000?". Typically the performance engineer will have to manipulate a large amount of data organized in spreadsheets and text files to arrive at the answers to these and other questions. Therefore, a need exists to overcome the inefficiencies in defining the queries and performing manual manipulation of performance data to arrive at answers to routine system performance questions.

A motivation of the present invention is to present the performance engineer with a class of questions and a novel apparatus to automatically organize measured data and modeled data into forms that answer system questions clearly and concisely into a visual form using charts, graphs, and tables saving much time and effort. Additionally the present invention provides the performance engineer with flexible means of manipulating complex reports so that valuable classes of reports may be saved as projects and templates to be recreated later. The ability to conveniently save templates combined with other novel mechanisms of the present invention allows the performance engineer the capability to create new questions or categories of reports that can be optimally tailored to the network under consideration.

SUMMARY OF THE INVENTION

The present invention teaches processes and apparatus to acquire and organize measured or modeled statistical data into optimal reports. In a design mode of use, a report designer utilizes the apparatus as a tool to create optimal reports from a variety of data sources, translating the reports into templates that can be reused to automate a reporting process to repeatedly solve a class of user defined problems. In a performance engineering mode of use, a performance engineer utilizes a process enabled by the apparatus whereby the engineer may select from a set of performance questions, connect the apparatus to a variety data sources, and through an interaction process enabled and guided by the apparatus and largely automated, create well-defined answers to the performance questions of interest. The performance engineer, may create templates or projects that capture the process and allow it to be repeated in a continual process to make network or system optimizations.

One embodiment of the present invention teaches a series of template manipulations whereby report objects that are embedded within templates may be defined, reused, modified and improved upon to optimize reports and the report building process in a design mode of operation or a performance engineering mode of operation.

Another embodiment of the invention teaches manipulation and use of data within data Tables for the automatic selection and population of other data tables. In particular, column selection and column header information is optimized for relevance to the report design or system question at hand. A novel mechanism for automatically joining data from a variety of data sources is also described that allows for the rapid construction of specific reports from within multiple data tables of different types, structures and formats.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2B is a block diagram showing a report object.

FIG. 3 is a block diagram showing the control and data flow of the present invention.

FIG. 4 is a block diagram showing the project document structure of the preferred embodiment of the present invention.

FIG. 5 is a flow diagram of the preferred embodiment of the mode of use of templates within the present invention.

FIG. 6 is a flow diagram of the table optimization function of the present invention.

FIG. 7 is block diagram of a first embodiment of the table optimization process of the present invention wherein the rules formation is coded in a static manner.

FIG. 8 is a block diagram of a second embodiment of the table optimization process of the present invention wherein the rules formation is coded in a dynamic manner.

FIG. 9 is a block diagram containing lists showing an example of column optimization rules formation within the table optimization process.

FIG. 10 shows a picture of a screen shot of an instance of an optimized output table and a listing of rules from a table optimization process executed by the present invention.

FIG. 11 is a block diagram of the automatic joining of multiple tables within the preferred embodiment of the present invention.

FIG. 12 is a process flow diagram of the automatic joining of multiple tables within the preferred embodiment of the present invention.

FIG. 13 is a block diagram of the virtual database structure within the preferred embodiment of the present invention.

FIG. 14 is a listing of an example of join specification match rules generated within the preferred embodiment of the present invention.

FIG. 15A-E is a listing of questions and reports within a preferred embodiment of the present invention.

FIG. 16A-C is a set of pictures showing representative example screen shots of visible reports generated by a preferred embodiment of the present invention.

FIG. 17A-J is an annotated listing of an example XML template file utilized within a preferred embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments described herein are merely illustrative of specific ways to make and use the invention and do not delimit the scope of the invention.

Figure 1:
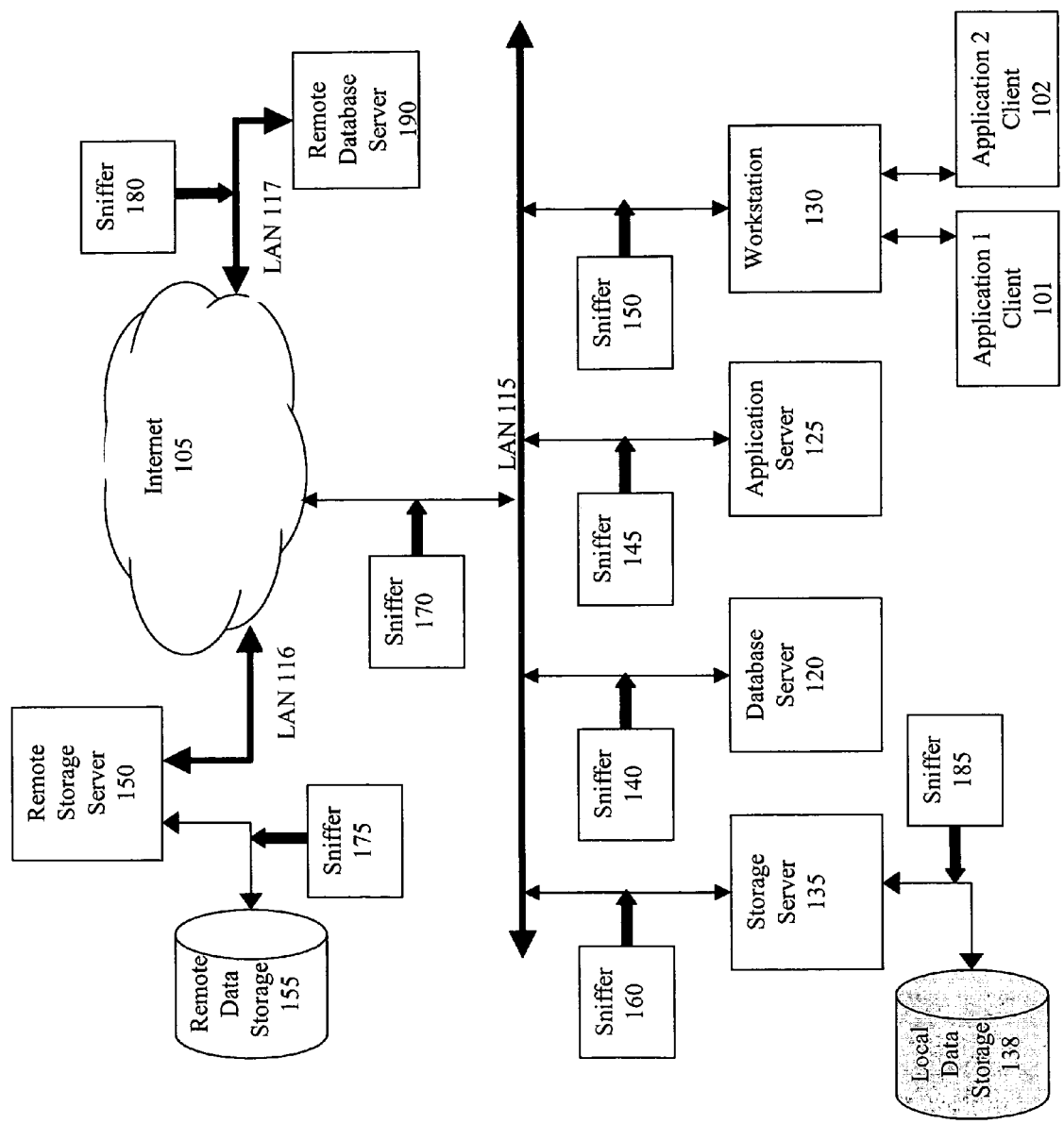
FIG. 1 is a schematic illustration of representative system to be optimized
Figure 2A:
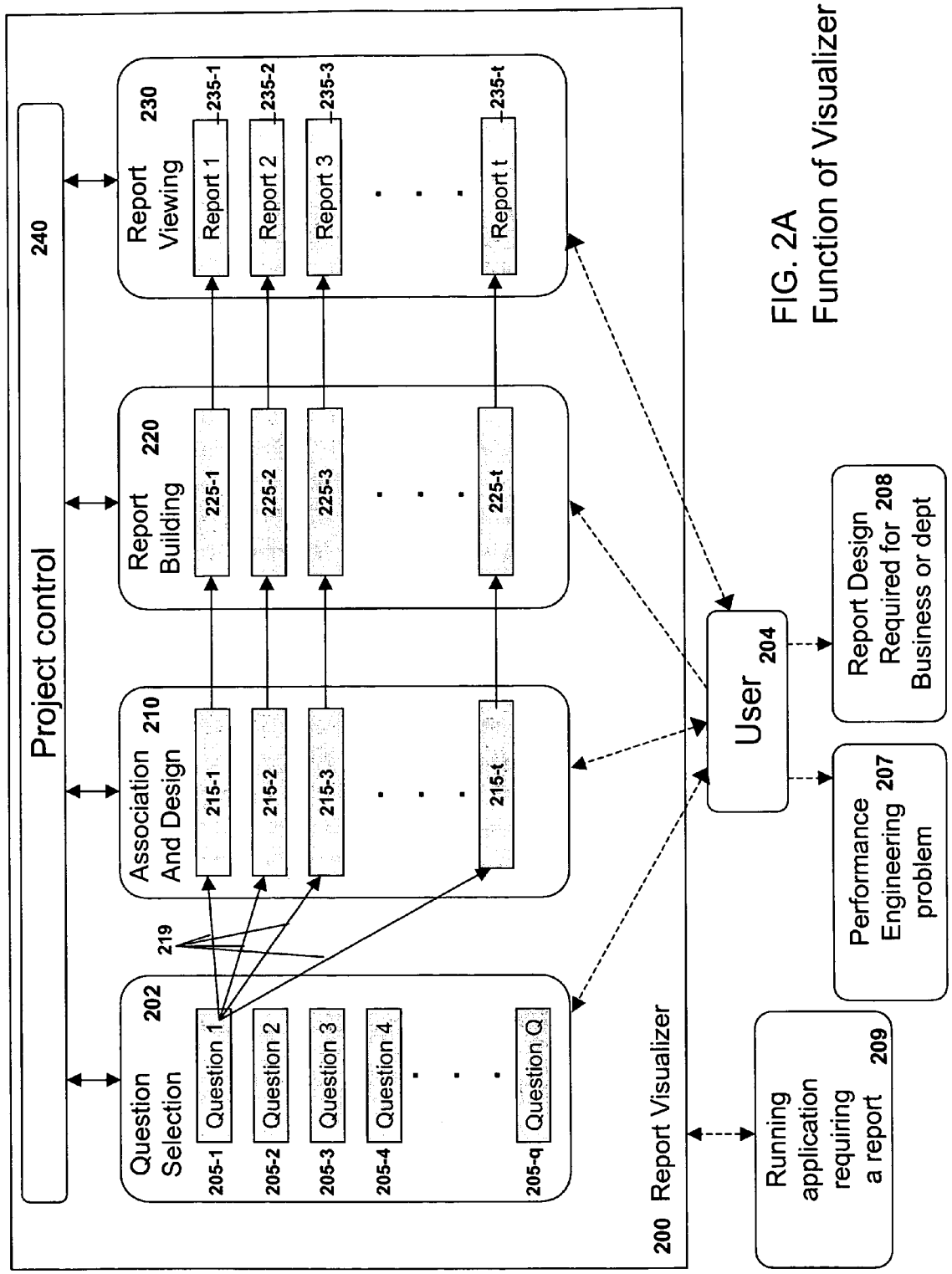
FIG. 2A is a block diagram showing the function of the present invention.

In FIG. 2A a report visualizer program 200, which constructs complex reports for a user 204, provides the following functions: A question selections process 202 for aiding user 204 in selecting a question from a list of questions to be answered by a report, a report design process 210 for gathering information and populating report designs from user 204, a report building process 220 for automatically gathering data into reports and preparing them for viewing, a report viewing process 230 for presenting reports visually to user 204 and a project control process 240 for initializing a project and for saving project information for later use by user 204. Solid arrows in FIG. 2A represent process flow between entities, dashed arrows represent information flow between entities. Process flow may also include information. User interfaces to report visualizer are standard windows having standard controls as is known in the art, an example being an Explorer window within the Microsoft Windows™ operating system.

There are two primary classes of users for the present invention. The first class of user will employ report visualizer program 200 to design a specialized report 208 that is required for a business customer or situation or for a departmental situation given some data (not shown) supporting the particular nature of the report. The first class of user will likely not require the question selection process 202, bypassing it in favor of heavy use of the report design process 210. One function of the present invention is to give user 204 a means of rapidly and easily designing reports that do not contain superfluous data and that can be repeatedly, perhaps automatically generated on, for example, a periodic basis. Within the preferred embodiment, user 204 benefits from generating and saving a set of report templates that correspond to the generated report designs.

The second type of user will employ report visualizer 200 to solve a particular set of performance engineering problems 207. The second type of user utilizes the process of selecting a performance related question in question selection process 202, accepting and or adding information to report designs 210, supplying raw data for the report building process 220 and viewing and interpreting the report in report viewing 230 to solve the performance related engineering problem. In the preferred embodiment, the second type of user benefits from a pre-defined set of questions in the questions selections process 202 that are associated with pre-defined report structures used throughout the process to create classes of reports that will aid the user in improving the performance of a system.

A set of certain system questions 205-1 through 205-q are created regarding the specific nature of a network or application performance. In the preferred embodiment, system questions 205 are represented as folders in a question selection software process 202 that allows a user 204 to select questions for further inquiry. The system questions 205-1 through 205-q comprise folder names that appear to user 204 and may be of the form of an interrogative denoted by a question mark, as in "What are the potential bottlenecks?" or they may be more generally of the form of a statement as in "Application Performance Reports". In the question selections process 202 there are up to Q questions 205 available for selection and one or more system questions 205 may be selected at a time. A list of 92 "questions" available in one preferred embodiment is shown in FIG. 15. Eleven of these "questions" are interrogatives. In other embodiments, questions may be worded differently and there may be fewer or more questions available for selection than shown in FIG. 15. In the preferred embodiment, question or report folders are internal to the visualizer program and not separately represented in the file system.

A particular system question has associated with it a certain number of report designs. The number of report designs associated with a system question can vary. For example, when system question 205-1 is selected in the questions selection process 202, the report design process 210 functions to prepare a list of report designs associated with the selected system question 205-1. Question-report associations 219 indicate a specific mapping between system question 205-1 and report designs 215-1 through 215-t. The report design process 210 allows user 204 to change the available list of report designs 215 by adding, deleting and editing report designs.

Once the report design process 210 completes, the report designs 215-1 through 215-t are saved into computer memory by the report visualizer program 200 as complete report objects 225-1 through 225-t to be used by the report building process 220. In the preferred embodiment, the report visualizer program 200 creates empty or default report data structures, with no data or with default data, respectively. The report design process 210 fills in the report data structures with the data or accepts the default data at which time the completed report data structure becomes a report object 225. The report design process 210 may be assisted by the user, modifying the data or form of the report. Alternatively, the process may include selecting a report design template from a dialog window displaying a preset number of format changes. FIG. 15 shows examples of 244 default report design templates.

FIG. 2B shows report object 225. In the preferred embodiment, report object 225 is constructed of various attributes. For example, the attributes include report name 226 (for identifying a report), data sources 227 (that contain data of interest), data tables 228 (pointers or references to data tables within the program), queries 229 (for extracting data), table transformations 231 (defining a set function to be performed on the table), data filters 232 (for manipulating data), table layouts 233 and chart layouts 234 for visualizing data. Report name attribute 226 names the report object and its subsequent charts or tables when they are created. Data sources attribute 227 are references to sources for data tables pointed to by the data tables attribute 228. Data tables are stored in computer memory in a standard program format in the preferred embodiment whereas the data sources may be in non-standard forms and may be generated by external programs, such as network measurement devices or network simulation programs. Data sources may also be formed from existing report objects. Queries attribute 229 are codes for specific searches within data tables that are designed and utilized to locate specific answers, in the form of numbers or text, to the associated aspect of the system question 205-1. Table transformation attribute 231 manipulates data within data tables referenced by data tables attribute 228. For example, a pivot transform is one of many functions that may be performed in a table. Data filters attribute 232 functions to remove unwanted information from data tables referenced by data tables attribute 228. Table layout attribute 233 and chart layout attribute 234 contain properties information required to visually display information from a data table.

Referring now to FIGS. 2A and 2B, the process of taking the information encapsulated in a report object 225, and converting that information into a form to be viewed is collectively called the report building process 220. The report building process functions to perform a set of queries 229 on a database and to perform transformations as per table transformation attribute 231 or data filters attribute 232 and place the resulting data into a query result. The report building process also functions to execute the layout of tables 233 or the layout of charts 234 for viewing in report viewing process 230. Properties information contained in the table layout 233 or chart layout 234 structures define the visual appearance of the report. The report building process 220 functions then to obtain and organize the data from various sources, processing and/or reducing the data so that it may become optimally sensible to a user in relation to a network or system question the user is attempting to answer or for a report design.

Continuing with FIG. 2A, report object 225-1 through report object 225-t sends appropriate instructions for display to report viewing process 230. The report viewing process converts report objects 225 into reports 235. Reports 235 are visual displays. The report object displays a unique report. The reports 235-1 through 235-t consist of charts and/or tables that are displayed on a computer monitor or similar device. In the preferred embodiment, the reports can also be printed, saved or exported to another program. For example, reports can be saved as image files (html, jpg, png), table reports can saved as a .csv file and viewed in Microsoft Excel.

Project control process 240 functions to open or close projects, initialize data structures within a project and to save projects and templates.

In an alternative embodiment, another mode of operation is available by connecting report visualizer to other running programs via an operating system interface or similar communications structure. A particular application 209 requiring a report may send a pre-defined report template to report visualizer 200 which automatically inserts the template into the report design process 210, runs the designs encapsulated in the template, builds the reports using report building process 220 and displays the report using report viewing process 230. Project control 240 will be used throughout to load files as required for the process without required user intervention.

It is seen that the present invention functions to efficiently answer system or network questions by choosing and organizing information from various data sources into data tables and charts and displaying them. The answer to these system or network questions can be used to facilitate decisions about such things as troubleshooting system problems, purchasing network components or deploying new business functions.

The structure of a preferred embodiment of report visualizer 200 is shown in the block diagram in FIG. 3. The various connections shown between the blocks in FIG. 3 are logical connections that indicate information flow from one block to another. A dynamic project document structure 300 within report visualizer 200 gathers data from measured results 385, or modeled results 384, or both, and organizes that data into reports 235 that provide insight to the system question. Data is collected from various network or system tests to form one or more data sources of measured results 385 for one or more networks or systems. Data is collected from various simulators or computer generated models to form one or more data sources of modeled results 384 for one or more networks or systems that may differ from those networks or systems used to generate measured results 385.

Measured results 385 or modeled results 384 may be stored in one or more physical locations, geographically remote from the machine that is operating the report visualizer 200 program, the information may flow from the data sources into report visualizer 200 using, for example, TCP/IP protocol over the Internet or other networking protocols.

Project document 300 also contains report wizard 352 which directs the process of creating or modifying the report definition. Report definition module 325 constructs an internal data representation of a report by querying the virtual database 382 and applying table column layout, filtering, sorting, transformations found in report object 225 attributes, found in memory, in a template or in a project. The report view 330 module constructs a GUI representation of a report from the content of the report definition. Report definition module 325 constructs an internal data representation of a report by querying the virtual database 382 and applying table column layout, filtering, sorting, transformations found in report object attribute 225, found in memory, in a template or in a project. The report view 330 module constructs a GUI representation of a report from the content of report definition 325. Tree view control module 320 organizes and displays a tree view and processes user commands from the tree view. The presentation control 362 module provides access to the visual attributes of a report so that the appearance of the report can be altered by the user.

Virtual database 382 is an object which is automatically initialized by project document 300 to populate internal data tables that correspond to data required to answer the system question. Virtual database 382 creates and manipulates data structures based on data obtained from modeled results 384 and measured results 385. Queries are sent to virtual database 382 by report definition module 325 to search its data tables for certain information. In response, virtual database 382 returns relevant subsets of information from its internal data tables to the report definition module. The queries and data tables are then included and referenced in report object 225, queries 229 and referenced data table references 228.

Tree view control 320 forms an interface with user 204 and with report definition module 325. Tree view control 320 sends the user's selected data to the report definition module 325. Tree view control 320 maintains the data structure for report definitions 325 allowing the user to create, insert, rename, delete or move a folder or report in its data structure.

Report view control module 330 uses standard Java GUI interfaces and objects which are accepted by graphics generation programs known in the art to create viewable content, such as report 335. Report view control module 330 interacts and displays content to a standard display unit, such as a computer graphics display device connected to a computer monitor screen and allows user interaction with presentation control 362. Tree view control 320 and report view control 330 are coupled and display their views simultaneously.

Presentation control 362 allows the user to aid in a report's visual attributes by modifying visual properties of the content maintained by reports definitions module 325. Upon exiting presentation control 362, the visual attributes within reports definitions module 325 and its corresponding report object 225 are updated and stored.

Report wizard 352 is a user interface utilized within the report design process 210 to construct or load new report objects 225 and set their attributes in report definitions module 325. The attributes include the identification of specific data sources 228 contained within measured results 384 or modeled results 385.

Reports definition module 325 is called by tree view control 320 to initiate the data structure corresponding to report object 225 and to run the methods associated with report object 225. Additionally, reports definition module 325, constructs report object 225 template fragment for inclusion in a project file or template file.

Project document 300 collects the information regarding the question selection and initializes virtual database 382. The virtual database then connects to the appropriate data sources 228, informing report definition 325 which of the report objects 225 to include on start-up. Project document 300 organizes the project information into data structures, called project files 372 and templates 275. Project files 372 are a "snap-shots" of the current state of the project document 300 and capture all of the relevant data to recreate that state. Project document 300 has a file saving and loading means by which project document 300 can save and retrieve project files 372 and report templates 275 to and from computer storage or memory.

In the preferred embodiment, a template file 375 is used to externally represent a set of report objects and their organization into system questions. Template file 375 is a text file which contains XML standard instructions sufficient to recreate all the report objects and their associated report definitions and reports. Project document 300 can save and retrieve template files 375 so that a multiplicity of reports and their structures can be reproduced in an automatic way. The use of template files 375 is described more fully below.

FIG. 17A-J is an example of a template created by the preferred embodiment of project document 300 within report visualizer 200. Examining FIG. 17A, the template is associated with a particular system question "How does the performance compare to the objectives?" labeled as "Folder:" 1000 in the second line and with a particular chart pertaining to that system question: "Business function response time compared to objective chart" 1001. The template contains a large number of structures which are annotated throughout. Those skilled in the art will easily comprehend the XML text by reading the annotations included.

For example, in FIG. 17A, a column definition 1002 is made within an XML construct for a column within a table with a header column name of "Business Function" containing the text "Business Function" and column value that is obtained from a specified modeled results table with formatted value specification "ScenarioResults.Statistics.comp_name".

In another example from FIG. 17E, table sorting and transform functions 1010 are defined and annotated for a pivot type transform on tables defined within the template.

In a third example from the template file, a query table "ScenarioResults.Statistics" 1012 is queried in FIG. 17F that looks for "BF" in the field "component" and looks for "response_time" in the field "stat_name".

Referring to FIG. 4, project document 300 includes a view model and a data model. The data model consists of the set of report definition objects 325-1, 325-2, . . . 325-t. The view model consists of a frame object which contains both a tree view 320 and a report view 330. Frame 310 is a container for the presentation of visual information and corresponds to a viewable window in the report visualizer application 200. Tree view 320 and report view 330, which are displayed simultaneously to the user 204, provide the particular organization and representation for presenting the reports that are in the data model as previously described. Frame object 310 gets data from reports definition modules 325-1, 325-2, . . . 325-t to generate corresponding viewable Reports 235-1, . . . , 235-t.

Tree view 320 consists of nodes 321-1 through 321-t organized into a tree of folders and reports within folders as stored in its data structure. The nodes form a representation of available reports that are associated with project document 300. With each node is associated a node name that encapsulates a particular question selection or a report name that answers a particular aspect of the system question. Nodes 321-1, . . . , 321-t are 1:1 associated with report definitions 325-1, . . . , 325-t (which encapsulate report object 225-1, . . . , 225-t information) so that a particular node draws its name from the report definition module 325 to which it is attached. Each node also contains a memory pointer to the associated report definition module 325 so that the nodes can access the entire report definition module 325 or information contained within the report definition module 325 to pass it to other components within the project document.

When a node 321 is selected from tree view 320, the associated report definition module 325 loads, processes its report, and ultimately displays it via report view 330. In a similar way, the report view 330 is associated with each report object 325. When a particular node 321 is selected for viewing within tree view 320, the report view 330 requests its information from the report definition module 325 associated with the selected node 321 to define a visual image of the associated report.

Templates 375 are used in a variety of processes to allow the report visualizer 200 considerable flexibility in its usage. The major manipulative steps 410, 420 and 430 within report visualizer 200 are shown in a process in FIG. 5 with a choice of variations for each step. Each variation involves particular template manipulations. The choice of variations is independent for each step. The steps are:

Step 410—Load an initial project document.
Step 420—Allow the user to make modifications to the project document to complete the creation of concrete report or reports
Step 430 Save the resulting project document as a template Step 410 has the following variations:
410.A. Create a project document, by automatically choosing a template or templates appropriate to the data files selected. This involves some analysis by the report visualizer 200 of the content of the selected files, including an analysis of what statistics are contained in the selected files.
410.B. Create the project document using the template and data files selected by the user or by the invoking program.
410.C. Create a new empty project document with no reports or questions. The user selects the data files to load.
410.D. Create a new project document using data files selected by the user or by the invoking program and using an existing project document as the basis for the report definitions. That is, use an existing project document as a template.
410.E. Load an existing project document.

Step 420 has the following embodiments and can be done repeatedly, mixing various embodiments in each repetition:
420.A. The user can insert, delete, modify, rename and rearrange reports and folders manually by interacting with the tree view, report wizard and presentation control associated with project document.
420.B. The user can insert a template defining a set of folders and reports into the open project document.

Step 430 has the following embodiments and can be done repeatedly, mixing various embodiments in each repetition:
430.A. The user can save the entire project document as a template.
430.B. The user can select a node (a folder or report) and save that node (and its associated folders) as a template.

FIG. 6 depicts a preferred embodiment of a function of report visualizer 200 for automating a process for producing visual and content optimal data tables for reports. A system of networks, servers and business applications is shown as 1100. Measured data 1110 and modeled data 1120 are extracted and calculated, respectively, from the system 1100. The measured data 1110 and modeled data 1120 are used as the data sources to form input data table 1130 which is contained in virtual database 282. Input data table 1130 contains N columns with distinct column headers, Column Header 1, Column Header 2, . . . Column header N and distinct data in each row of each column, data-11, data-12, data-13 . . . data-NK. Each column has K rows. Statistical information related to a system question is encoded in the data within input data table 1130 and may be scattered across different data positions. Column header information within input data table 1130 is textual, data within input data table 1130 may be text or numerical.

In report visualizer 200, user 1175 with a particular system issue to solve 1165 in relation to the system 1100 will be presented with a choice of system statistics to investigate 1169. Upon the user selecting a set of system statistics to investigate 1169, a table optimization and layout process 1170 is performed that automatically optimizes the statistical information and layout a new optimal data table 1180. During this process, the content is reduced and optimized and the headers are renamed to give relevant visual information. For example, optimal data table 1180 contains M+3 columns, shown with column headers "Identifier 1 New Header" and "Identifier 2 New Header" and statistics data columns shown with column headers "New Descriptive Column Header", "Associated Statistic Value 1", . . . "Associated Statistic Value M". The identifier data is shown as ID value 1. . . ID value 6, the statistic data is shown as returned data-11. . . returned data-M3. Other instances of optimal tables (not shown) may contain more or less than two identifier columns and more or less than the three rows of data and the columns that get renamed will vary widely. New descriptive column headers may appear on identifier columns and Associated statistic headers.

The user may utilize the information in optimal data table 1180 to optimize specific business applications, network performances and/or server performances within the system 1100, or to answer certain performance questions at issue.

A more detailed description of the table optimization and layout process 1170 in FIG. 6 is shown in FIG. 7. Table optimization process 1170 is constructed of a tree view 1250 for display and select functions, table properties 1230 containing information and methods for layout, rules 1400 for optimizing, and table layout generator 1270 for producing a visible table. Table optimization and layout process 1170 further interacts with user 1280, input table object 1210 and output table object 1220. Input table object 1210 and output table object 1220 are analogous to input data table 1110 and optimal data table 1180 in FIG. 6. The various connections between the entities shown in FIG. 7 indicates interaction and information flow between the entities.

Table properties 1230 is a data structure containing data and methods required for successful layout of Output table 1220. Table properties 1230 contains class names 1231 defined for table object 1210, class associations 1232 defined for table object 1210, value associations defined for table object 1210, rules methods 1234 for table object 1210 and layout methods 1238 for describing the layout of new table object 1220.

Tree view checklist 1250 utilizes class names 1231 and class associations 1232 to display a check list 1255 for user 1280 to select from. Tree view checklist 1250 sends a query or set of relevant queries 1272 to table layout generator 1270. Table layout generator 1270, in turn, uses the query along with processing methods from table properties 1230, and data from input table object 1210 to construct the output table object 1220 which is made visible to user 1280. User 1280 directs the information in output table object 1220 to optimize the system 1100. During said process, a version of the output table object 1220 may be displayed to user 1280 without data values so that user 1280 has opportunity to further refine the table properties 1230.

Table properties 1230 data structures relate to the content of input table object 1210 by organizing input table object 1210's column headers into class identifier columns with class column names 1231, statistics that are associated with the class identifier columns known as class association instance columns 1232, and specific statistic associated value columns 1233 which are columns of values associated with a particular statistic. Examples of associated instance columns and associated value columns include, respectively, an instance name column (such as "Component name") associated with an instance type column (such as "Component type") and statistics value columns (such as "mean", "maximum", "minimum") associated with a statistic type column (For the statistic type value "response time", the associated value columns may be appropriate to display, whereas for other statistic type values, the columns may not be needed). The rules methods 1234 within table properties are used to construct layout processing instructions based on rules 1400. In the preferred embodiment, the rules methods 1234 may be added by the user into the table properties. The rules 1400 and the process for selecting the rules 1400 to code the rules methods 1234 is explained further below. Layout data 1238 is also contained within table properties 1230 which is a repository for visible layout properties of the output table object 1220.

Tree view checklist 1250 is a visible frame of check list 1255 showing the statistics available in the input data table 1210. A check box 1252 for selecting statistics from check list 1255 is provided. Check box 1253 is selected as an example. The statistics are organized in a tree view with nodes 1254a-1254x. Only the leaf nodes are selectable and these correspond to particular queries: query input 1272 is generated for leaf node 1254b as an illustrative example. All the nodes shown except node 1254a and node 1254g are leaf nodes as shown in tree view checklist 1250. The tree view organization is customized for each data table in a way that will help the user find statistics. In a preferred embodiment, the queries generally resolves to a set of values to match the Class Columns for the data table. Statistics differ only in the statistic type value and otherwise share the same Class Column. Value specifications tend to be adjacent to Class columns.

Table layout generator 1270 is a process with query input 1272, properties input 1275, table data input 1276 and a display output 1278. Table layout generator examines the queries from query input 1272 to assist in executing table processing rules from properties input 1275. User 1280 is provided a table layout (not shown) without data from Input data table 1210 to verify the suitability of the new table layout for output table object 1220 and to further edit output table object's 1220 layout properties 1238 if required. The processed data is then laid out into a visual format according to the layout information also gathered from properties input 1275 and displayed to display output 1278.

Referring back to FIG. 3 and FIG. 7, in the preferred embodiment tree view checklist 1250 exists within the project document 300 and is displayed via the report wizard 352. Table Properties 1230 exists within the virtual database 382 and is created before and during the input table object 1210 creation. The input table object 1210 also exists within the virtual database 382. The table layout generator 1270 functions within report wizard 352. The output table object 1220 is displayed as a table layout in the report wizard 352 and then as a report in report view 330.

Another embodiment of table optimization process 1170 in FIG. 6 is shown in FIG. 8. In this embodiment, table optimization process 1170 is constructed of a tree view checklist 1350 for display and selection, table properties 1330 to contain table information and properties for layout, rules 1400, dynamic rules Formation processor 1365 for applying Rules 1400 and table layout generator 1370 for displaying a table. Table optimization process 1170 interacts with user 1380, input table object 1310 for optimizing layout and output table object 1320. Input table object 1310 and output table object 1320 are analogous to input data table 1130 and optimal data table 1180 in FIG. 6. The various connections between the entities shown in FIG. 8 indicate interaction and information flow between the entities.

Table properties 1330 is a data structure containing data required for successful layout of output table object 1320.

Table properties 1330 contains class names 1331 defined for table object 1310, class associations 1332 defined for table object 1310, value associations defined for table object 1310, and layout properties 1338 for describing the layout of new table object 1320.

Tree view checklist 1350 utilizes class names 1331 and class associations 1332 to display a check list 1355 for user 1380 to select from. Tree view checklist 1350 sends a query or set of relevant queries 1372 to table layout generator 1370. Table layout generator 1370, in turn, uses the query along with processing methods from table properties 1330, and data from input table object 1310 to construct the output table object 1320 which is made visible to user 1380. User 1380 directs the information in output table object 1320 to optimize the system 1100. During said process, a version of the output table object 1320 may be displayed to user 1380 without data values so that user 1380 has opportunity to further refine the table properties 1330.

Table properties 1330 data structures relate to the content of input table object 1310 by organizing input table object 1310's column headers into class identifier columns with class column names 1331, statistics that are associated with the class identifier columns known as class association instance columns 1332, and specific statistic associated value columns 1333 which are columns of values associated with a particular statistic. Examples of class association instance columns and associated value columns include, respectively, an instance name column (such as "Component name") associated with an instance type column (such as "Component type") and statistics value columns (such as "mean", "maximum", "minimum") associated with a statistic type column (For the statistic type value "response time", the associated value columns may be appropriate to display, whereas for other statistic type values, the columns may not be needed). Layout properties 1338 is also contained within table properties 1330 which is a repository for visible layout properties of the output table object 1320.

Tree view checklist 1350 is a visible frame of check list 1355 showing the statistics available in the input data table 1310. A check box 1352 for selecting statistics from check list 1355 is provided. Check box 1353 is selected as an example. The statistics are organized in a tree view with nodes 1354a-1354x. Only the leaf nodes are selectable and these correspond to particular queries; query input 1372 is generated for leaf node 1354b as an illustrative example. All the nodes shown except node 1354a and node 1354g are leaf nodes as shown in tree view 1350. The tree view organization is customized for each data table in a way that will help the user find statistics. The queries generally resolve to a set of values to match for the class columns for the data table. Statistics differ only in the statistic type value and otherwise share the same class column. Value specifications tend to be adjacent to class columns.

Dynamic rules formation processor 1365 has an input 1361 for table property information which is tied to table properties 1330, an input directly from a table object which is tied to the input table object 1310, an input 1373 for rules tied to Rules 1400 and an output 1374 for encoded rules tied to table layout generator 1370. The encoded rules are column formation instructions for the output table object 1320 that are specifically based on the information in the input table object 1310.

Table layout generator 1370 is a processor with query input 1372, properties input 1375, rules instructions input 1374, table data input 1376 and a display output 1378. Table layout generator executes the queries from query input 1372 to assist in executing table layout processing rules from dynamics rules formation processor 1365. User 1380 is provided a table layout (not shown) without data from input data table 1310 to verify the suitability of the new table layout intended for output table object 1320 and to further edit output table object's 1320 layout properties 1338 if required. The processed table is put into a visual format according to the layout information also gathered from properties input 1375 and displayed to display output 1378.

Referring back to FIG. 3 and FIG. 8, tree view checklist 1350 exists within the visualizer project document 300 and is displayed via the report wizard 352. Table properties 1330 exist within the virtual database 382 and is created before and during the input table object 1310 creation, the input table object 1310 also exists within the virtual database 382. The table layout generator 1370 functions within report wizard 352. The dynamic rules formation processor 1365 functions within the report definition module 325 structure and the output table object 1320 is displayed as a table layout in the report wizard module 352 and then as a report in report view 330.

In a preferred embodiment, there are two types of columns assumed in the Rules 1400 within the preferred embodiment of the invention: Class identifier columns which identify the class of entity that one or more columns in a row refer to and associated columns which break down further into associated instance columns and associated value columns. Typically, the association is one of dependence, if the class column value is not available in a particular table, the associated identifier or value columns will also be assumed not to be available. The rules 1400 are typically not executed in a pre-defined order, but follow the table layout process so that if a particular column is laid out first (from left to right across the table) then its associated rules will execute first.

The rules 1400 for table optimization process in the preferred embodiment of the present invention are:

A. Class Column Behaviors Based on Query
   1. Drop the column if it is only blank or if it does not contain available values allowed by the given query.
   2. Drop the column if it is unique, that is the given query specifies exactly one value allowed for this column.

B. Associated Column Behaviors Based on Query
   1. Drop the column if the associated class column is dropped by rule A.1 above.
   2. Replace the column heading with the class value if the class column value is the only class column value requested in the given query.
   3. Prepend the column heading with the class value if the class column value is the only class column value requested in the given query.
   4. Append the column heading to the class value if the class column value is the only class column value requested in the given query.
   5. Include or exclude a column based upon the queried values in a class column.
   6. Drop the column if it is not used for the associated class column values selected.

C. Class Column Behavior Based on Values in the Data Table
   1. Drop a column if the data table only contains a single value for the column.

D. Implicit Associated Column Behaviors Based on Query
   1. Replace a column heading with a different pre-defined value if the associated class value is in a predefined set of values.

E. Some Columns Are Always Dropped
   1. Do not include the column in the report table by default.

The B-rules are not mutually exclusive, except that rule 2 cannot be applied at the same time as rules 3 or 4, and rules 3 and 4 are not generally applied at the same time.

The original column names as they appear in an input table object are optionally replaced by other more readable text in a column heading in an optimized output table object. The improved text for column headings presented to the user is encoded in a table properties object associated with the input table object in the preferred embodiment.

The substitution of presentation values is not a necessary feature required for optimizing table columns, but is a useful embodiment. Substitution of presentation values is applicable when the set of possible values is known (or partially known) prior to generating the report table layout, so that a set of substitutions can be pre-defined.

Within the preferred embodiment, other predefined transforms are allowed. Transforms can include capitalization changes and pluralization changes. For example, when the unique class column value is "Response time" and the associated default column heading is "Mean", "Mean" becomes "Response time mean" or "Mean response time" using rule 3 or 4 above.

Another embodiment of the present inventive technique to modify the table title to reflect a unique class identifier column value selected.

The D-rule is closely related to the B-rules. However, in the D-rule, the associated class value is determined not explicitly from a class identifier column but instead is deduced from the values queried in some other column. For example, in a particular data tables there is a component name (instance) column, but there is not a corresponding component type (class) column. Instead, the component type is encoded into the statisistic names in the statistic type column. There will be several statistics for each component type and each statistic name pertains to only a single component type. The statistic type column is examined to see if all selected statistics belong to the set of values pertaining to the same component type if the component name column is to show the component type when all of the selected statistics refer to a single component type. Values for class identifier columns can be replaced with presentation values defined in a table properties file.

In one embodiment, column behavior may be specified by code written by the user to implement the behavior in a static rules formation process. In an alternate embodiment, the column behaviors are specified by listing the behaviors in a properties file or other data structure and defined at run-time to execute dynamic rules that are responsive to input data table and rules 1400. In other embodiments, column behaviors may be specified as some combination of both.

To further illustrate the table optimization process, a specific example is given in FIG. 9 with some associated visible output screens for various queries in FIG. 10.

In FIG. 9, an example of a table object 1710 is shown that has associated with it a list of available column objects and presentation names 1720, a list of class column associations 1740, a list of statistic value associations 1730, and a list of specific rules 1750 that are executed on the table object 1710 to create a new optimized output table.

The available column objects and presentation names 1720 for the present example are enumerated by listing the column object on the left (e.g., BFSummary.col.Subsystem.pName) and the presentation name on the right (same e.g. as previous, Subsystem) with an equivalence symbol=between them. All of the column objects available for export are listed in this way; the list resides in the table properties, such as table properties 1230 or 1330 shown in FIGS. 7 and 8.

The class column associations 1740 for the present example are enumerated showing the available class columns on the left (e.g., statistic) and the associated column names on the right (e.g., Mean).

The value associations 1730 for the present example are enumerated by listing the statistic classes on the left (e.g., bfResourceStatsList) and the associated value, in this case statistic value on the right (e.g. WriteCount).

Specific rules 1750 are formed from the available column objects and presentation names 1720, class column associations 1740, statistic value associations 1730 and rules 1400 which are A-rules, B-rules, C-rules, D-rules, and E-rules defined previously. For example, "Run name" in list 1720 appears as a presentation name in the table object 1710, so that the C.1 rule must be included in the rules list. A second example is for the column "Maximum". The B.5 rule for "Maximum" must be included in specific rules 1750 since "Maximum" appears as an associated column in list 1740. Furthermore, if a query that gets processed later includes any non bfResourceStatsList statistics, then the "maximum" column is kept and placed in the optimized output table (as well the minimum, total, num intervals and duration columns). Taking this example of B.5 rule further, if "CPUUtil" is selected as a part of a subsequent query, then "mean", "minimum", "maximum", "total", "num intervals" and "duration" columns in the input table will be included in the optimized output table (:"mean" is included because rule B.4 is a part of the specific rules 1750, but only on the condition that "CPUUtil" is the only associated value in the query).

In FIG. 10 is shown an optimized output table 800 that is automatically generated by applying the specific rules 1750 in the processing of an instance of table object 1710 when the query for "bfResponseTime" statistic is selected from a tree view. The rules 810 to obtain table 800 are shown in FIG. 10. The output table 800 is a screen image of a window generated by the report visualizer program 200 within a Microsoft Windows operating environment. Without the table optimization process using rules 810 the output table 800 would have looked like unoptimzed table 820 also shown in FIG. 10. However, the unoptimized table 820 would have been even less attractive had the column names in the data table been less readable.

Referring to FIG. 9 and the rules 810 in FIG. 10 the automatic generation of output table 800 by application of rules is explained. Although the instance of table object 1710 is created in a particular measurement run, there is no run number column in the output table 800 because the 810 C.1 rule eliminated it (since it would be redundant information, i.e., all run numbers would be the same in the output table if they were not eliminated). The 810 D.1 rule applies to the association of "bfResponseTime" with the class identifier "business function" which is an implicit association not called out in table properties for table object 1710, but known to the table layout generator 1270 shown in statistic value association list 1730. The bfStatsList classification results in "business function" as the implicit component type (and therefore a potential column heading for component column). There is no subcomponent column. The "bfResourceStatsList" classification results in "business function" as the implicit component type (and therefore a potential column heading for component column). The subsysStatsList classification results in "Computer" as the implicit component type (and therefore a potential column heading for component column). The result of the 810 D.1 rule is the appearance of the "business function" column header and column in output table 800. The next rule applied is the 810 B.5 rule, which drops the subcomponent information about the system since "subcomponent" does not appear explicitly in the statistic type class column associations 1740. The process proceeds to execute rule 810 A.2 which eliminates a column of text values, in this case "response time" that describe the statistic for which the "mean", "maximum", "total", etc. statistics are given in each row. As in the run number example, keeping "response time" in every row would be redundant in the output table, so it is better to rename the "mean" column holding the returned response time mean values to "mean business function response time". This is the task of rule 810 B.4. Finally, rule 810 B.5 executes performing the process of including the "minimum", "maximum", "total", "duration" and "num intervals" columns in the final table. 810 B.5 includes these because according to specific rules 1750 those columns are to be included if a non bfResourceStatsList value is selected for query. Since "bfResponseTime" is a value associated with "bfSTatsList", the other associated statistic columns defined in class associations 1740 are included and appear in the righthand part of the output table 800.

An example of an output table generated in the previous situation is also shown in FIG. 10 as table 820. There are empty columns (subsystem) and several columns with redundant information (statistic, run time) of no value to the user. Also, the column headings do not explain clearly what they pertain to.

A description of the virtual database 282 function for table joining within the report visualizer 200 is shown in FIG. 11. Virtual database 1550 functions to automatically join a primary data table 1506 to zero or more secondary data tables 1507 to form a single query result data table 1508. Primary data table 1506 is composed of a multiplicity of columns containing a multiplicity of rows of data cells. Secondary data table 1507 is likewise composed of a multiplicity of columns containing a multiplicity of rows of data cells. Query result data table 1508 is similarly composed of a multiplicity of columns containing a multiplicity of rows of data cells. The number of columns and rows in each data table may differ from one to the other.

Query 1509 requesting a particular set of data is sent to virtual database 1550, and designates primary data table 1506 and zero or more secondary data tables 1507 from which to draw the prescribed set of data. Query 1509 expects a new data table to be returned that is comprised of all the data matching the query specification that can be found among the specified tables. Virtual database 1550 first sets the query 1509 against primary data table 1506 and puts the queried content into a newly constructed Data Table 1508*a*. Virtual database 1550 performs a series of join instructions to match content from data tables 1507; the matched content 1508*b* is appended to the queried content 1508*a* to form query result data table 1508 which is returned to query 1509 as the processed result.

A UML sequence diagram is shown in FIG. 12 describing a multiple data table query 1500 in the preferred embodiment. The vertical axis of the diagram indicates increasing time going from top to bottom. The horizontal axis of the diagram indicates movement from one program entity to another; the program entities are visible in the diagram as user 1510 for program control, report wizard 1520 for program control, report view 1530 for requesting and displaying reports, report definition 1540 for building report queries, virtual database 1550 for organizing data tables and performing queries on them, primary data table 1560 which holds relevant data and operates on it, secondary data table 1570 which holds relevant data and operates on it and join specification 1580 which holds and executes instructions to join primary data table 1560 to zero or more secondary data table 1570 together. Vertical dashed lines indicate the timeline behavior associated with each program entity. Along each timeline a set of time periods labeled 1511, 1521, 1531, 1541*a*, 1541*b*, 1551, 1561, 1571 and 1581 are shown, each time period indicating that the program entity above it is operating during that time period, either operating specifically on data or waiting for another process to complete and return. Arrows shown from left to right indicate requests or pieces of information transferred or program control between entities and will be explained below.

Beginning at the top left side of the diagram and progressing to the right, user 1510 completes a defining or refining process in report wizard 1520 to finish a report design 1512. Report Wizard 1520 sends the data and issues a command 1522 to build a report to report definition 1540. Report definition 1540 during time period 1541*a* assembles all of the report definition information in Report object 225 (queries, transforms, filters, table layout, chart layout) into its internal representation. In particular, the representation of the query 1542*a* against the selected data tables is stored in an appropriate format ready to be sent to Virtual Database 1550.

At a later time, report wizard 1520 signals report view 1530 to create a visible report via signal 1524. Report View 1530 tells report definition 1540 to get the data corresponding to report definition 1512 and return the report data via signal 1532*a*. Report definition 1540 upon receiving the instruction 1532*a* to get the data, sends the previously constructed query 1542*a* to virtual database 1550. Virtual database 1550 accepts query 1542*a* and executes it as query 1552*a* against the primary data table 1560. Primary data table 1560 assembles the data corresponding to query 1552*a* during time period 1561 and returns the data 1552*b* to virtual database 1550. A query is then executed against the secondary table 1570—this query essentially consisting of a command 1554*a* to send all of the data in secondary data table 1570 back to virtual database 1550. The data 1554*b* from secondary table 1570 is returned and the virtual database then begins the process of appending the secondary table 1570 data 1554*b* to the returned query data 1552*b*.

The append or join process is accomplished by virtual database 1550 when it calls join specification 1580 with a join command 1556*a*. Join specification 1580 completes the join process and returns the joined data table 1556*b* to virtual database 1550.

The joined data table 1556*b* is sent back to report definition 1540 as table 1542*b*; report definition 1540, in turn, assembles the report data from the table 1542*b* and other attributes of the report definition 1540 and sends the report data 1532*b* to Report View 1530 for viewing. report view 1530 creates a visible report and displays it on a computer monitor as described previously but not shown.

The virtual database 1550 has a structure for managing data tables which is shown in FIG. 13. The virtual database 1550 is composed of internal database 1630 which manages a list of the data tables 1620 and provides a central point of access to the data in said data tables 1620; a data source manager 1614 which functions to control, load and populate data sources 1618 and has a concrete DSMgr implementation 1615 for specifically working with different program entities; data source 1618 which contains, creates, populates and manages a set of data tables 1620 representing the data from the data source 1618 and implements functionality common to all concrete data sources 1619; data tables 1620 that contain a row and column representation of the data and support the accessing of this data as required by the database and certain properties of the data tables as required to support queries, joins and table layout optimization and has a concrete data table 1621; a table join specification object 1624 that is a structure for holding and executing concrete join specs 1625; and concrete join specs 1625 that are associated with each concrete data table 1621.

Virtual database 1550 exists within a project document 1610 of the same kind as project document 300 previously described. Project document 1610 initializes virtual database 1550, by specifying and loading the concrete DSMgr 1615 and concrete data sources 1619 and through reports definition modules, queries virtual database 1550 for data from data tables 1620.

The concrete DSMgr implementation 1615 utilized in the context of the preferred embodiment of the present invention is specifically coded to work with the report visualizer 200. The concrete DSMgr 1614 organizes the data sources and data tables appropriately for project document 1610 and the Data Sources 1618 in turn make their data tables 1620 available to the database 1630. In the preferred embodiment, the database manager 1614 utilizes a Java plug-in architecture which accepts standard jar files to package the concrete data sources 1619 and concrete DSMgr implementations 1615. Other embodiments are conceived whereby the database 1550 is used with other programs to perform similar functions to those described; this being accomplished by coding a specific concrete DSMgr implementation for the program of interest.

Concrete Data sources 1619 which are loaded into the data source 1618 can be designed to load data from spreadsheet files, text files, binary coded data files, other databases, and data streams such as those with FTP protocol specifications. All of these data sources are encapsulated in a Java .jar package along with information about the structure of the data to be loaded and how that data is to be represented in the data tables 1620 in the virtual database 1550. Other types of data sources may be conceived in other embodiments of the present invention.

Concrete data tables 1621 are constructed from data sources 1618 as instances of the database data tables 1620. Concrete data tables 1621 are made up of a multiplicity of columns containing a multiplicity of rows containing data within each row.

Associated with each concrete data table 1621 is one or more concrete join specs 1625 containing specific instructions pertaining to which data tables 1620 may be joined with it and rules for how those tables are joined together. The specific information is coded into a table join specification for execution by the database 1550 as described previously. The rules for joining will be described further.

Table 1 contains a pseudocode implementation of the join process which occurs near the end of the time period 1551 in the process diagram of FIG. 12. In Table 1:line 1, the assumptions for the pseudocode to operate are given, namely that a primary table with a set of rows is supplied and secondary table with a set of rows is supplied and that the two will be joined into a resultant table. Note that the pseudocode given will also work in the case when no secondary table is supplied since there will be zero rows from a secondary table. The step numbers that follow correspond to line numbers in Table 1. Step 2 implements a flow control For loop that cycles through all the rows in the given primary table. Step 3 implements a nested flow control For loop that cycles through each row in the given secondary table. Inside the nested For loop on the secondary table, a set of operations occur pending the condition that the row values match. The check for a row value match is step 4; the definition of a row value match will be discussed further in the next paragraph. If the row value does match then the data from the secondary table row is appended onto the matching row in the primary table in step 5 to augment the join result. Step 6 checks if it is possible to drop rows taken from the secondary table for join execution efficiency; if so then the row of the secondary table just used to create a join row is removed from the set of secondary rows being considered as join candidates. Step 7 performs a similar function to step 6: it checks that only one match is allowed per primary row table and if so the outer loop increments to the next row in the primary table and the process moves forward with step 3 at the first row of the secondary table. Steps 8, 9 and 11 terminate the structures of steps 4, 3 and 2, respectively. Step 10 automatically adds any primary row to the join result that does not match the secondary table. Step 12 returns the join result set to the calling program.

TABLE 1

| | |
|---|---|
| 1 | Assumption: We have a set of rows from a primary table and a set of rows from a secondary table that we are trying to join into a join result set. |
| 2 | For each row in primary table result |
| 3 |    For each row in secondary table result |
| 4 |       if rows match then |
| 5 |          create join result row by appending secondary row to primary row. |
| 6 |          if only one match allowed for secondary table row, then remove row from secondary table result |
| 7 |          if only one match allowed for primary table row, then exit inner for |
| 8 |       end if |
| 9 |    end for |
| 10 |    if no match found for primary row, then add primary row to join result set. |
| 11 | end for |
| 12 | return the join result set. |

An Example of the handling of join rules for matching rows is shown in FIG. 14. There are two classes of rules shown, those that are general join handling rules 1680 and those that are more specific and complex join handling rules 1690. The goal of these rules is to determine whether primary table row and a secondary table row match. Lines 1681 through 1687 form the general rules. Lines 1691 through 1694 form specific complex rules.

A concrete properties file (not shown) packaged with a concrete data source object 1619 forms a concrete join spec 1625 that can fully specify some joins. This is illustrated in the present example in FIG. 14, where three tables, "runs" table, "BFSummary.BFSummary" table, and "ScenerioResults.Runs" table are involved in the specification. The properties within the joinTableList attribute of the table "runs" 1681a indicate what tables can be joined to, namely "BFSummary.BFSummary" 1681c and "ScenarioResults.Runs" 1681d which are listed in the joinTableList attribute 1681b in line 1681. Each joinable table indicates which columns are the key columns that must exactly match values in the other table. For example, in lines 1682 and 1683, "runNumber" is the name of the key column that is used to join tables "BFSummary.BFSummary" and "runs" table. The "runs" table column name(s) used in the join is specified in property "myJoinColumns" as "runNumber". The column name(s) for the columns from table "BFSummary.BFSummary" that correspond to the columns specified in "myJoinColumns" is listed in property "matchCol" as "runNumber". The column names for the join columns from the two tables happens to be the same in both tables ("runNumber"), but need not be. More than one column could have been listed in "myJoinColumns" and "matchCol" to indicate that the values for multiple columns were to be compared with the corresponding column from the other table when trying to join rows. Similarly lines

1685 and 1686 specify the key columns for joining tables "Runs" and "ScenarioResults.Runs". Reverse roles attribute, line 1684 and line 1687 indicate whether the role of primary and secondary table can be reversed in the join process. The join is specified from the perspective of a secondary table; in this case "runs" is secondary. If "runs" is primary, the reverseRoles attribute is set to true. As shown, "runs" is secondary in the case of joining with "BFSummary.BFSummary" by line 1684 but primary in the case of joining with "ScenarioResults.Runs" by line 1687.

Referring to FIG. 14, complex rules example 1690 in the following description. Two tables are involved in a complex join specification 1690, namely "BFSummary" 1691a and "ScenarioResults.Statistics" 1691c. In particular, "ScenarioResults.Statistics" 1691a table is included in the joinTableList attribute 1691b of the "BFSummary" table 1691a. The join of "BFSummary" to "ScenarioResults.Statistics" cannot be fully specified in the concrete properties file's properties in the current implementation because the join is not a simple test for exact match in the values of one or more columns. To handle this case the concrete properties file (stored within the concrete data source object) identifies the class that implements the join (statement 1692); namely:

ipsvisualizer.ipsexplorerplug-in.bfsummary.BFSummaryJoinSpec.

In this example of the preferred embodiment, that class was hand coded and packaged within the data source object. In statement 1693 and statement 1694, the equivalentValues properties are used to identify equivalences between Statistics column values of the two tables, for example "bfrhruput" in the secondary table with "throughput" in the primary table. These value equivalences are used in the joinSpec class that implements the join (statement 1692), namely:

ipsvisualizer.ipsexplorerplug-in.bfsummary.BFSummaryJoinSpec when checking to see if rows are equivalent, i.e. if they match.

FIG. 15(A, E) is a printout of a tabular list 1050 of the standard report templates that are available within the preferred embodiment of the present invention. In the first column 1051 of the list 1050 is a set of row numbers which will be used to refer to information within the list 1050, for example rows 15-1 and 15-2 in FIG. 15A indicate that there are 92 report folders available, 244 reports and 11 system questions available in the preferred embodiment. Report folders contain a number of report templates. The second column 1052 lists a set of report names available to the user. The third column 1053 identifies if the report name in the second column 1052 is a report folder. The fourth column 1054 identifies if the report name in the second column 1052 is a report template. The fifth column 1055 identifies the report name in the second column as a system question. Examples of information in FIG. 15 will be explained in conjunction with FIG. 16. The templates are the templates 275 in this description. The system questions and report folders are the System Questions 205 in this description.

In FIG. 16(A,C) is an example collection of a visible reports showing several of the types of reports that can be generated by the invention. The set of visible reports has been generated using the preferred embodiment of the invention and in particular correspond to certain report templates selected from the list 1050 in FIG. 15. The visible reports are the Reports 235 in this description. The data used to generate FIG. 16 is indicative of a certain set of tests on a multiplicity of business function performances in a network of systems.

In FIG. 16A is pie chart report 16-51 of the "business function mix" showing the percentage of business function throughputs per business function in a mix of three business functions. The pie chart report 16-51 is generated by selecting and running report template "business function throughput chart" shown in FIG. 15A, row 15-51.

In FIG. 16A is comparison bar chart report 16-145 of the "business function response time compared to objective". The bar chart report 16-145 is generated by selecting and running report template "business function response time evaluation compared to objective chart" shown in FIG. 15B: row 15-145. Report template 15-145 is one of several reports generated by the system question "How does performance compare to the objectives?" shown in FIG. 15B: row 15-143. It indicates the $90^{th}$ percentile statistical business function response time (solid) in comparison to an objective business function response time.

Figure 16B:
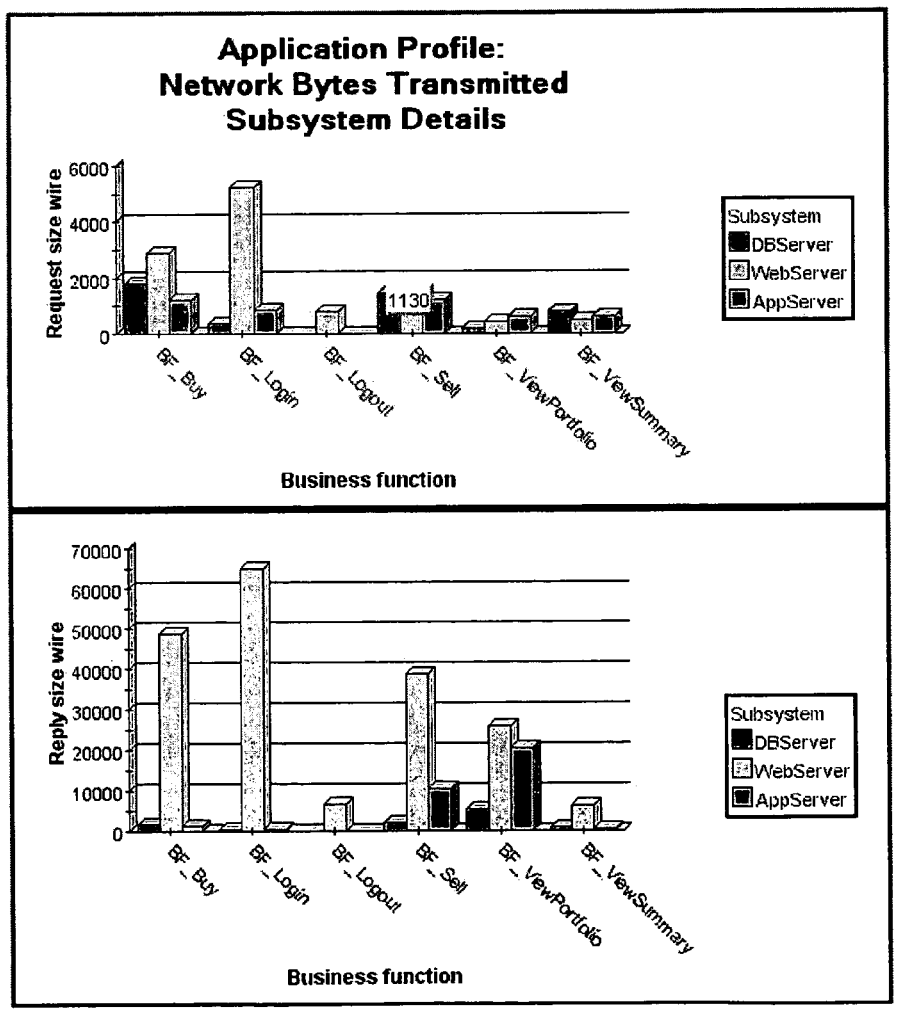

In FIG. 16B is table 16-146 of the "business function response time evaluation". It is also one of several reports generated by the system question "How does performance compare to the objectives?" in FIG. 15C: row 15-146. The table 16-146 is also generated by selecting and running report template "business function response time evaluation" shown in FIG. 15C: row 146. It indicates a FAIL, PASS, OR CAUTION situation for each business function based on their measures response times.

In FIG. 16B are dual bar graphs 16-181 of the "application profile: network bytes transmitted subsystem details" showing request transmissions and reply transmissions in bytes from sixbusiness functions on three servers, DBserver, Webserver and Appserver. The dual bar graphs 16-181 were generated by selecting and running report template "Network bytes transmitted subsystem details" shown in FIG. 15C: row 181.

In FIG. 16C is stacked bar graph 16-258 of a "T1 Run Comparison" showing mean response times in several runs of a business function and their breakdowns on three servers and a client, DBserver, Webserver, Appserver and Client. The bar graph 16-258 was generated by selecting and running report template "Response time subsystem details" shown in FIG. 15D: row 258.

In FIG. 16C is dual axis line graph 16-316 of a "T3 Run Comparison" showing business function throughput and CPU utilizations for ten business functions running on three servers, DBserver, Webserver and Appserver. The bar graph 16-316 was generated by selecting and running report template "Throughput vs. response time for T3 Comparison" shown in FIG. 15E: row 316. Line graph 16-316 indicates one of the motivations for the present invention of taking the complex function of collecting the test data for three different variables from at least 13 data sources and combining that data through the table query and table join mechanisms and report template manipulations taught herein to form a report that is useful for understanding in the present context, for example, which servers need to be upgraded, what business functions consume the most resources and how the system scales with the number of users.

The implementation of the processes in the preferred embodiment is accomplished using a set of Java applications in a Java application framework that interact together to produce the overall program. The Java applications code exists in computer memory and runs on the computer's CPU (or multiple CPUs) utilizing the various resources of the computer, including computer memory, hard disk drives, graphics display units and network interfaces. The Java applications code may also utilize resources attached to a network connected to the computer such as application servers, storage servers or database servers. Other embodiments may use other object oriented programming languages, or structured languages, or hardcoding in firmware, or some combination to implement parts or the whole of the present invention. As is well-known in the art of computer programming, objects generated within an object-oriented language may encapsulate data structures and may contain methods to manipulate those data structures and perform other operations. Objects and modules refer to entities that contain data structures and that may contain executable code to perform operations on those data structures. A "program" refers to certain combinations of objects (or modules), the logical information flow between the objects and the process by which the objects interoperate to perform the functions described.

While this invention has been described in reference to a preferred embodiment along with other illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method of employing a computer system to organize computer system performance data into visible reports to answer a computer system inquiry comprising the steps of:
   providing a computer system having a processor, a memory, and a display monitor, all in operational connection;
   providing a report wizard module running on the computer system for controlling the functions of the computer system;
   providing a report view module running on the computer system for requesting and displaying a report;
   providing a report definition module running on the computer system for building a report object;
   providing the computer system inquiry having an inquiry related to a set of measured results of the computer performance data and a set of modeled result sets of the computer system performance data;
   providing a virtual database, comprising the set of measured results of the computer system performance data and the set of modeled results of the computer system performance data, running on the computer system for organizing a data table and performing a query on the data table;
   wherein the report wizard module is used to develop a report design corresponding to the computer system inquiry, and send the report design and a build report instruction to the report definition module;
   wherein the report definition module receives the build report instruction and in response thereto assembles a set of report definition information into a report object stored in memory;
   wherein the report wizard module sends a create visible report signal to the report view module;
   wherein the report view module receives the create visible report signal and in response sends a get data signal to the report definition module;
   wherein the report definition module receives the report object and in response organizes the data table and returns an optimized data table to the report view module;
   wherein the report view module receives the optimized data table and creates a visible report and displays it on the display monitor;
   providing a primary data table stored in the memory, holding a first-set of computer system performance data;
   providing a secondary data table stored in the memory, holding a second set of computer system performance data;
   providing a join specification, stored in the memory, to contain and execute an instruction to join the primary data table and the secondary data table;
   wherein the virtual database upon receiving the report object executes a query against the primary data table;
   wherein the primary data table assembles the first set of computer system performance data according to the query and returns the assembled first set of computer performance data to the virtual database;
   wherein the virtual database upon receiving the report object executes the query against the secondary data table;
   wherein the secondary data table sends the second set of computer system performance data to the virtual database according to the query;
   wherein the virtual database upon receiving the second set of computer system performance data appends the second set of computer system performance data to the assembled first set of computer system performance data by execution of the join specification to form a joined data table; and
   wherein the virtual database sends the joined data table to the report view module for display on the display monitor.

2. The method of claim 1 including the further steps of:
   providing a set of measured computer system performance data in the first set of computer system performance data; and
   providing a set of modeled computer system performance data in the second set of computer system performance data.

3. The method of claim 1 wherein the join specification includes instructions to optimize the first set of computer system performance data and the second set of computer system performance data.

4. The method of claim 1 including the further steps of providing a query attribute, a transfer attribute, a filter attribute, a table layout attribute and a chart layout attribute in the report object.

* * * * *